United States Patent [19]

Awane et al.

[11] Patent Number: 4,608,487
[45] Date of Patent: Aug. 26, 1986

[54] INPUT UNIT OF AN AUTOMATIC VENDING MACHINE

[75] Inventors: Misao Awane; Seiji Hara; Satoshi Kobayashi, all of Kitaadachi, Japan

[73] Assignees: Sanyo Electric Co., Ltd.; Tokyo Sanyo Electric Co., Ltd., both of Japan

[21] Appl. No.: 592,410

[22] Filed: Mar. 23, 1984

[30] Foreign Application Priority Data

| Mar. 31, 1983 | [JP] | Japan | 58-57611 |
| Mar. 31, 1983 | [JP] | Japan | 58-57612 |
| Apr. 6, 1983 | [JP] | Japan | 58-61117 |
| Apr. 6, 1983 | [JP] | Japan | 58-61118 |
| Apr. 6, 1983 | [JP] | Japan | 58-61120 |
| Apr. 6, 1983 | [JP] | Japan | 58-61122 |

[51] Int. Cl.[4] .................................. G06K 15/00
[52] U.S. Cl. ................................ 235/383; 194/353; 235/375; 235/462; 235/472
[58] Field of Search ............... 235/383, 462, 472, 375; 194/1 N; 222/2

[56] References Cited

U.S. PATENT DOCUMENTS

| 3,918,029 | 11/1975 | Lemelson | 235/472 |
| 3,961,747 | 6/1976 | Small et al. | 235/383 |
| 4,180,204 | 12/1979 | Koenig et al. | 235/472 X |
| 4,392,564 | 7/1983 | Hayashi | 194/1 N |

Primary Examiner—David L. Trafton
Attorney, Agent, or Firm—Darby & Darby

[57] ABSTRACT

An input unit adapted to input operation orders and set informations, necessary to automatic sales operations, into an automatic vending machine. The input unit is capable of easily coping with the changes in and the addition to the input contents, of easily and positively inputting the selling prices as the set information, of remarkably reducing the signal harness for input use into an automatic vending machine.

9 Claims, 28 Drawing Figures

Fig. 7

| processing code | 9 bit code | processing code | 9 bit code |
|---|---|---|---|
| 0 0 | 0 0 0 1 1 0 1 0 0 | 1 2 | 0 0 1 0 0 1 1 0 0 |
| 0 1 | 1 0 0 1 0 0 0 0 1 | 1 3 | 0 0 0 0 1 1 1 0 0 |
| 0 2 | 0 0 1 1 0 0 0 0 1 | 1 4 | 1 0 0 0 0 0 0 1 1 |
| 0 3 | 1 0 1 1 0 0 0 0 0 | 1 5 | 0 0 1 0 0 0 0 1 1 |
| 0 4 | 0 0 0 1 1 0 0 0 1 | 1 6 | 1 0 1 0 0 0 0 1 0 |
| 0 5 | 1 0 0 1 1 0 0 0 0 | 1 7 | 0 0 0 0 1 0 0 1 1 |
| 0 6 | 0 0 1 1 1 0 0 0 0 | 1 8 | 1 0 0 0 1 0 0 1 0 |
| 0 7 | 0 0 0 1 0 0 1 0 1 | 1 9 | 0 0 1 0 1 0 0 1 0 |
| 0 8 | 1 0 0 1 0 0 1 0 0 | 1 A | 0 0 0 0 0 0 1 1 1 |
| 0 9 | 0 0 1 1 0 0 1 0 0 | 1 B | 1 0 0 0 0 0 1 1 0 |
| 0 A | 1 0 0 0 0 1 0 0 1 | 1 C | 0 0 1 0 0 0 1 1 0 |
| 0 B | 0 0 1 0 0 1 0 0 1 | 1 D | 0 0 0 0 1 0 1 1 0 |
| 0 C | 1 0 1 0 0 1 0 0 0 | 1 E | 1 1 0 0 0 0 0 0 1 |
| 0 D | 0 0 0 0 1 1 0 0 1 | 1 F | 0 1 1 0 0 0 0 0 1 |
| 0 E | 1 0 0 0 1 1 0 0 0 | 2 0 | 1 1 1 0 0 0 0 0 0 |
| 0 F | 0 0 1 0 1 1 0 0 0 | 2 1 | 0 1 0 0 1 0 0 0 1 |
| 1 0 | 0 0 0 0 0 1 1 0 1 | 2 2 | 1 1 0 0 1 0 0 0 0 |
| 1 1 | 1 0 0 0 0 1 1 0 0 | 2 3 | 0 1 1 0 1 0 0 0 0 |
| | 8 bit code | | 8 bit code |

Fig. 8A

|     | 00 | 01 | 02 | 03 | 04 | 05 | 06 | 07 | 08 | 09 |
|-----|----|----|----|----|----|----|----|----|----|----|
| 0 A | display-of multi-vending or single vending | column specification by selection switch | | display of existence of exchange setting | | set price display | sales amount display | sales number display | sales amount display for each column | sales number display for each column |
| 0 B | column NO 1 | column NO 2 | column NO 3 | column NO 4 | column NO 5 | column NO 6 | column NO 7 | column NO 8 | column NO 9 | column NO 10 |
| 0 C | | *10 | *20 | *30 | *40 | *50 | *60 | *70 | *80 | *90 |
| 0 D | multi-vending number limitless | multi vending number limit 1 | multi vending number limit 2 | multi vending number limit 3 | multi vending number limit 4 | multi vending number limit 5 | multi vending number limit 6 | multi vending number limit 7 | multi vending number limit 8 | multi vending number limit 9 |
| 0 E | | | | | | | | | | |
| 0 F | vending test column NO 1 | vending test column NO 2 | vending test column NO 3 | vending test column NO 4 | vending test column NO 5 | vending test column NO 6 | vending test column NO 7 | vending test column NO 8 | vending test column NO 9 | vending test column NO 10 |
| 1 0 | column alternation of columns No.1 No.2 is released | column alternation of columns No.1 columns No.2 is set. | column alternation of columns No.3 No.4 is released | column alternation of columns No.3 columns No.4 is set. | column alternation of columns No.5 No.6 is released | column alternation of columns No.5 columns No.6 is set | column alternation of columns No.7 No.8 is released | column alternation of columns No.7 columns No.8 is set | column alternation of columns No.9 No.10 is released | column alternation of columns No.9 columns No.10 is set |
| 1 1 | | selling price display unavailable | selling price display available | | | | | | | |
| 1 2 | free vending released | free vending set | | | | | | | | |

Fig. 8B

| | 0A | 0B | 0C | 0D | 0E | 0F | 10 | 11 | 12 | 13 |
|---|---|---|---|---|---|---|---|---|---|---|
| 0A | | | | | | | | | | |
| 0B | | column No 11 | column No 12 | column No 13 | column No 14 | column No 15 | column No 16 | column No 17 | column No 18 | column No 19 | column No 20 |
| 0C | | ¥100 | ¥200 | ¥300 | ¥400 | ¥500 | ¥600 | ¥700 | ¥800 | ¥900 |
| 0D | | | | | | | | | | |
| 0E | | | | | | | | | | |
| 0F | | vending column No 11 | vending column No 12 | vending column No 13 | vending column No 14 | vending column No 15 | vending column No 16 | vending column No 17 | vending column No 18 | vending column No 19 | vending column No 20 |
| 10 | | | | | | | | sales amount cleared | | | |
| 11 | | | | | | | | | sales number cleared | all cleared | |
| 12 | | | | | | | | | | | |

Fig. 8C

| | 14 | 15 | 16 | 17 | 18 | 19 | 1A | 1B | 1C | 1D |
|---|---|---|---|---|---|---|---|---|---|---|
| 0A | | | | | | | | | | |
| 0B | column No 21 | column No 22 | column No 23 | column No 24 | column No 25 | column No 26 | column No 27 | column No 28 | column No 29 | column No 30 |
| 0C | | ¥1000* | ¥2000* | ¥3000* | ¥4000* | ¥5000* | ¥6000* | ¥7000* | ¥8000* | ¥9000* |
| 0D | | | | | | | ¥500*←¥100* exchange set | ¥500*←¥100* exchange released | ¥1000*←¥100* exchange set | ¥1000*←¥100* exchange released |
| 0E | | | | | | | | | | |
| 0F | vending test column No 21 | vending test column No 22 | vending test column No 23 | vending test column No 24 | vending test column No 25 | vending test column No 26 | vending test column No 27 | vending test column No 28 | vending test column No 29 | vending test column No 30 |
| 10 | | | | | | | | | | |
| 11 | | | | | | | | | | |
| 12 | | | | | | | | | | |

Fig. 8D

|   | 1 E | 1 F | 2 0 | 2 1 | 2 2 | 2 3 |
|---|---|---|---|---|---|---|
| 0 A |  |  |  |  |  |  |
| 0 B | column No 3 1 | column No 3 2 |  |  |  | all column |
| 0 C |  |  |  |  |  |  |
| 0 D |  |  |  |  |  |  |
| 0 E |  |  |  |  |  |  |
| 0 F | vending test column No 3 1 | vending test column No 3 2 |  |  |  |  |
| 1 0 |  |  |  |  |  |  |
| 1 1 |  |  |  |  |  |  |
| 1 2 |  |  |  |  |  |  |

Fig. 8E

| | 00 | 01 | 02 | 03 | 04 | 05 | 06 | 07 | 08 | 09 | 0A | 0B | 0C | 0D | 0E | 0F | 10 | 11 | 12 | 13 | 14 | | 2C | 2D |
|---|---|---|---|---|---|---|---|---|---|---|---|---|---|---|---|---|---|---|---|---|---|---|---|---|
| 00 | 0 | 10 | 20 | 30 | 40 | 50 | 60 | 70 | 80 | 90 | 1000 | 1010 | 1020 | 1030 | 1040 | 1050 | 1060 | 1070 | 1080 | 1090 | 2000 | | 2080 | 2090 |
| 01 | 100 | 110 | 120 | 130 | 140 | 150 | 160 | 170 | 180 | 190 | 1100 | 1110 | 1120 | 1130 | 1140 | 1150 | 1160 | 1170 | 1180 | 1190 | 2100 | | 2180 | 2190 |
| 02 | 200 | 210 | 220 | 230 | 240 | 250 | 260 | 270 | 280 | 290 | 1200 | 1210 | 1220 | 1230 | 1240 | 1250 | 1260 | 1270 | 1280 | 1290 | 2200 | | 2280 | 2290 |
| 03 | 300 | 310 | 320 | 330 | 340 | 350 | 360 | 370 | 380 | 390 | 1300 | 1310 | 1320 | 1330 | 1340 | 1350 | 1360 | 1370 | 1380 | 1390 | 2300 | | 2380 | 2390 |
| 04 | 400 | 410 | 420 | 430 | 440 | 450 | 460 | 470 | 480 | 490 | 1400 | 1410 | 1420 | 1430 | 1440 | 1450 | 1460 | 1470 | 1480 | 1490 | 2400 | | 2480 | 2490 |
| 05 | 500 | 510 | 520 | 530 | 540 | 550 | 560 | 570 | 580 | 590 | 1500 | 1510 | 1520 | 1530 | 1540 | 1550 | 1560 | 1570 | 1580 | 1590 | 2500 | | 2580 | 2590 |
| 06 | 600 | 610 | 620 | 630 | 640 | 650 | 660 | 670 | 680 | 690 | 1600 | 1610 | 1620 | 1630 | 1640 | 1650 | 1660 | 1670 | 1680 | 1690 | 2600 | | 2680 | 2690 |
| 07 | 700 | 710 | 720 | 730 | 740 | 750 | 760 | 770 | 780 | 790 | 1700 | 1710 | 1720 | 1730 | 1740 | 1750 | 1760 | 1770 | 1780 | 1790 | 2700 | | 2780 | 2790 |
| 08 | 800 | 810 | 820 | 830 | 840 | 850 | 860 | 870 | 880 | 890 | 1800 | 1810 | 1820 | 1830 | 1840 | 1850 | 1860 | 1870 | 1880 | 1890 | 2800 | | 2880 | 2890 |
| 09 | 900 | 910 | 920 | 930 | 940 | 950 | 960 | 970 | 980 | 990 | 1900 | 1910 | 1920 | 1930 | 1940 | 1950 | 1960 | 1970 | 1980 | 1990 | 2900 | | 2980 | 2990 |

Fig. 12 selling price setting (column No. in the order of price)

| column No. | | prices | | | |
|---|---|---|---|---|---|
| 1 | ‖‖‖‖‖ | ¥10 | ‖‖‖‖‖ | ¥140 | ‖‖‖‖‖ |
| 2 | ‖‖‖‖‖ | ¥20 | ‖‖‖‖‖ | ¥150 | ‖‖‖‖‖ |
| 3 | ‖‖‖‖‖ | ¥30 | ‖‖‖‖‖ | ¥160 | ‖‖‖‖‖ |
| 4 | ‖‖‖‖‖ | ¥40 | ‖‖‖‖‖ | ¥170 | ‖‖‖‖‖ |
| 5 | ‖‖‖‖‖ | ¥50 | ‖‖‖‖‖ | ¥180 | ‖‖‖‖‖ |
| 6 | ‖‖‖‖‖ | ¥60 | ‖‖‖‖‖ | ¥190 | ‖‖‖‖‖ |
| 7 | ‖‖‖‖‖ | ¥70 | ‖‖‖‖‖ | ¥200 | ‖‖‖‖‖ |
| 8 | ‖‖‖‖‖ | ¥80 | ‖‖‖‖‖ | ¥210 | ‖‖‖‖‖ | specified by selection switch

‖‖‖‖‖

| | | ¥90 | ‖‖‖‖‖ | ¥220 | ‖‖‖‖‖ |
| | | ¥100 | ‖‖‖‖‖ | ¥230 | ‖‖‖‖‖ | all columns same price

‖‖‖‖‖

| | | ¥110 | ‖‖‖‖‖ | ¥240 | ‖‖‖‖‖ |
| | | ¥120 | ‖‖‖‖‖ | ¥250 | ‖‖‖‖‖ |
| | | ¥130 | ‖‖‖‖‖ | ¥260 | ‖‖‖‖‖ |

INPUT UNIT OF AN AUTOMATIC VENDING MACHINE

BACKGROUND OF THE INVENTION

The present invention relates to an input unit which inputs the operation orders and set information, necessary to automatic sales operations, into an automatic vending machine.

In recent years, various new functions have been added to an automatic vending machine. Such new functions include display of sales money-amount and sales number, confirmation of multi-vending, column alternation, exchange, set selling prices, vending tests, etc. In any of them, the automatic vending machine needs inputs of the operation orders and setting information. For example, the display functions of the sales money-amount and the sales number are adapted to display on a display unit the sales total amount, the sales total number, which are calculated and stored for each of the sales operations, through the inputting of the operation orders for the sales money-amount and the sales number display. Generally speaking, the multi-vending indicates a function of continuously selling a plurality of commodities within the inputted money amount. However, in this case, a set information as to the continuous sales number of the commodities the customer wants to buy is required to be inputted. Also, column alternation means a function of alternately discharging a commodity from each sales column each time the commodity is selected by a customer when the same kinds of commodities are accommodated within two columns or more. In this case, the set information as to which column used as column alternation is required to be inputted. Besides, the confirmation display of the set selling prices is adapted to display on the display unit the selling price, which has been set to the commodity of the column corresponding to the selection switch, when a selection switch is depressed in a condition where any coins have not been inputted into the automatic vending machine. To cause such confirmation display to be performed, a set information of "display" of the confirmation display is required to be inputted into the automatic vending machine. Likewise the vending test enables the commodities to be sold without the inputting of the coin. In this case, the operation instructions of the vending test and a set information for specifying a column to be vending-tested are required to be inputted. Furthermore, an operation order of the selling price setting and a selling price as a set information are required to be inputted even when the selling price is set with respect to the commodities for each column.

The most common input unit of an automatic vending machine is a keyboard. A coin-operated Musical Machine for selecting and inputting a record performed by a keyboard is disclosed in U.S. Pat. No. 3,869,032 and U.S. Pat. No. 3,985,217. An Automatic Drink Dispensing Apparatus for selecting and inputting beverage to be fed by a keyboard is disclosed in U.S. Pat. No. 3,991,911. However, to input the above-described various operation orders and the set information by a keyboard, the operating procedure of the keyboard is so complicated that a user who is not used to the operation finds it difficult to operate the keyboard.

When a controlling circuit of an automatic vending machine is microcomputerized as at the present time, to add the new functions required due to the market demands to the completed automatic vending machine may be made only through changes in ROM, wherein the controlling procedures of the automatic sales are stored. However, when the new operation order input and the set information input are required through the addition of the functions, scanning lines necessary to the key and the key scanning are required to be added. The existing keyboard will not follow this requirement.

Also, to set the selling prices in an automatic vending machine, a plurality of two-contact switches were turned on or off to set the selling prices in a binary code as disclosed in U.S. Pat. No. 4,056,181. The error operations of the switches or the conversion errors into the binary codes were caused, thus resulting in frequent setting errors.

SUMMARY OF THE INVENTION

An object of the present invention is to provide an input unit which is capable of easily inputting various operation orders and set information into an automatic vending machine.

Another object of the present invention is to provide an input unit which is capable of easily coping with the changes in and the addition to the input contents.

A further object of the present invention is to provide an input unit which is capable of easily and positively inputting the selling prices as the set information.

A still further object of the present invention is to provide a smaller-sized input unit which is capable of remarkably reducing the signal harness for input use into an automatic vending machine.

According to the present invention, there is provided an input unit of an automatic vending machine comprising a bar sheet, wherein an operation order to be inputted into an automatic vending machine and set information, which is necessary for achieving an automatic sales operation, are printed by given bar codes, a hand scanner type of bar code reader equipped with a light emitting element and a photoelectric conversion element, said light emitting element is adapted to sequentially apply its light on bars or spaces through manual movement in accordance with the arrangement of the bars and spaces of said bar codes, said photoelectric conversion element is adapted to detect the light reflection amount from said light emitting element to output electric signals corresponding to the pattern of the bar code, means for converting the signals from said photoelectric conversion element into digital signals, means for converting said operation orders and said set information, shown by said digital signals, into codes which can be recognized by the automatic vending machine.

These and other objects, features, aspects and advantages of the present invention will become more apparent from the following detailed description of the present invention when taken in conjunction with the accompaying drawings.

BRIEF DESCRIPTION OF THE DRAWINGS

FIG. 7 is a comparison table of the processing code between 9-bit code and 8-bit code;

FIG. 8A through FIG. 8E are tables describing an operation order or set information each showing the processing code;

FIG. 12 is a sketch view showing one example of a bar sheet for use in selling price input;

DESCRIPTION OF THE PREFERRED EMBODIMENTS

Figure 1:
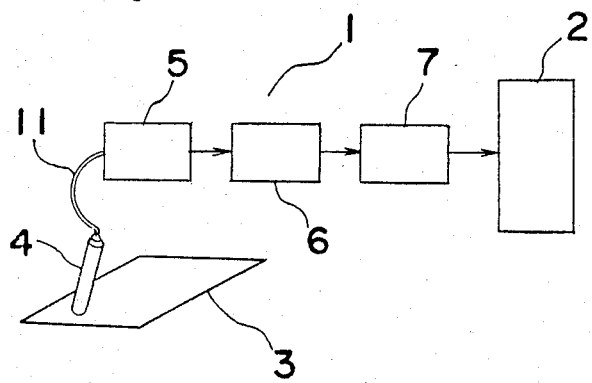
FIG. 1 is a functional block diagram showing an input unit of an automatic vending machine in accordance with the present invention.

Before the description of the present invention proceeds, it is to be noted that like parts are designated by like reference numerals through several views of the accompanying drawings.

Figure 3:
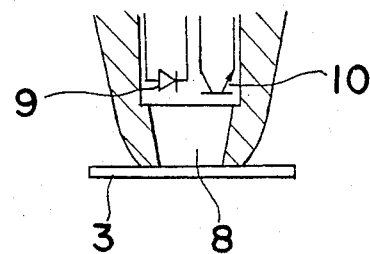
FIG. 3 is a cross-sectional view of the portions of a bar code reader.
Figure 2:
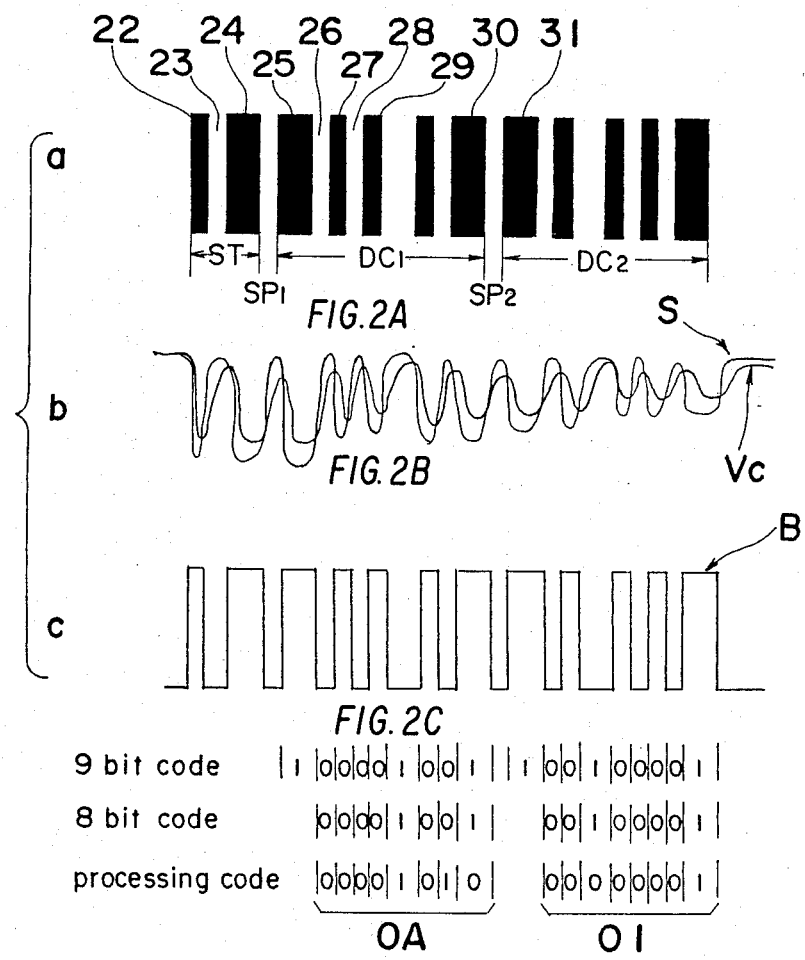
FIGS. 2(a) to (c) show views showing bar code patterns, signal waveforms corresponding thereto, and codes, respectively.

Referring to FIG. 1, an input unit (1) of an automatic vending machine in accordance with the present invention is connected with a controlling circuit (2) of the automatic vending machine. The input unit (1) is composed of a bar sheet (3) on which an operation order and a setting information to be inputted into the automatic vending machine are printed, a bar code reader (4) of a hand scanner type, a current-voltage converting circuit (5), a wave-form shaping circuit (6), a processing circuit (7). In the bar code printed in the bar sheet (3), a block bar and a space are alternately arranged in the longitudinal direction. As shown in FIG. 2a, one bar code pattern of the present example is composed of a start character portion ST, a character space SP1, a data character portion DC1, a character space SP2, a data character portion DC2. Each of the data character portions is composed of nine pieces of bars and spaces in total to be arranged in 3 out of 9 codes. One bar code pattern has 2-character on information amount. The arrangement of 3 out of 9 codes totally includes three pieces of bars and spaces each having large width within one character of nine bits. The thick bar or space shows a logic "1", while the narrow bar or space shows a logic "0". The bar code reader (4) is pen-shaped for easier hand-scanning operation and is provided, at its tip end portion, with an opening (8) as shown in FIG. 3. The opening (8) has an infrared LED (9) and a phototransistor (10) accommodated therein. The infrared LED (9) is adapted to apply the infrared light towards the opening (8) and the phototransistor is adapted to provide a photoelectric conversion output through reception of the light, from the infrared LED (9), reflected by the bar sheet (3) located outside the opening (8). A lead wire (11), which is adapted to guide the photoelectric conversion output to the current-voltage converting circuit (5), is extended from the end portion located on the side opposite to the opening (8).

Figure 4:
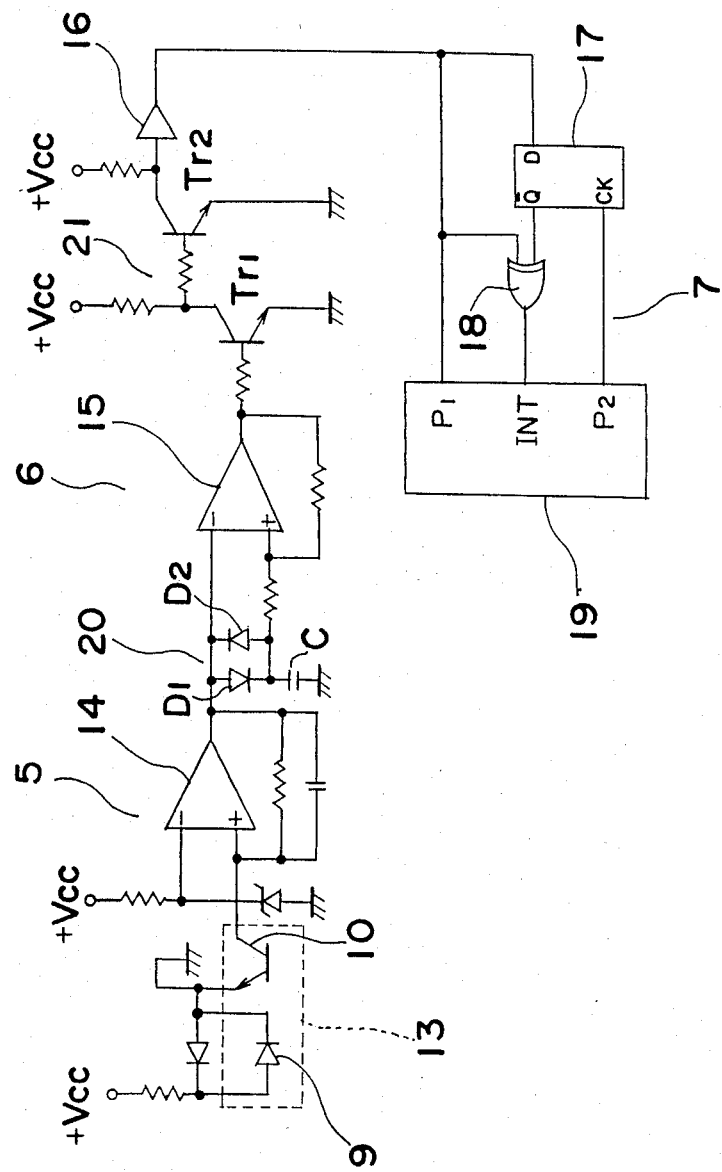
FIG. 4 is an electric circuit diagram of the input unit.

FIG. 4 shows the concrete construction of the electric circuit portion in the input unit (1). A photo-reflector (13) is provided with an infrared LED (9) and a photo-transistor (10). The reflected light applied by the infrared LED (9) is converted into current by the photo-transistor (10). The current-voltage converting circuit (5) is provided with an operation amplifier (14) of a current input type to convert into voltage the reflected light current provided by the photo-transistor (10). The waveform shaping circuit (6) is composed of a peak-value detecting circuit portion (20) of diodes D1, D2 and a capacitor C, an operation amplifier (15), an output circuit portion (21) of transistors Tr1, Tr2. Also, the processing circuit (7) is composed of a microcomputer (19), which is connected, at a port P1, with the output circuit portion (21) through an amplifying circuit (16), a D type flip-flop circuit (17), whose D terminal is connected with the amplifying circuit (16) and whose clock terminal CK is connected with the port P2 of the microcomputer (19), an exclusive or (EOR) gate (18), whose input side is connected with the $\overline{Q}$ output terminals of the amplifying circuit (16) and the D type flip flop circuit (17) and whose output side is connected with the interrupt terminal INT of the microcomputer (19). Move the bar code reader (4) under the above-described construction in the longitudinal direction of such bar code as shown in FIG. 2a, and the current-voltage converting circuit (5) generates such signals as shown in FIG. 2b in accordance with the output current change of the photo-transistor (10) caused through the reflected light. And in a peak value detecting portion (20), a diode D1 conducts in the rising region of the signal S to charge a capacitor C. The terminal voltage $V_C$ of such a capacitor C as shown in FIG. 2b becomes a value obtained through subtraction of the forward voltage $V_F$ portion of the diode D from the signal S. On the other hand, in the falling region wherein the signal S has been lowered by $V_F$ or more from the positive peak value, the diode D2 is conducted to cause the capacitor C to discharge. The terminal voltage $V_C$ of the capacitor C becomes a value, that is higher by the forward direction voltage $V_F$ portion of the diode D than the signal S. And whe the signal S becomes higher by $V_F$ or more than the negative peak value, the terminal voltage $V_C$ of the capacitor C becomes lower by the $V_F$ portion than the signal S. In operational amplifier (15), the terminal voltage $V_C$ of the capacitor C is applied upon the (+) input terminal, and the signal S is applied upon the (−) input terminal. Accordingly, the operational amplifier (15) produces the positive output in a range wherein the terminal voltage $V_C$ is larger than the signal S. A bar code pattern detecting signal B of digital signals is provided, as shown in FIG. 2c, from the output circuit portion (21).

Figure 5A:
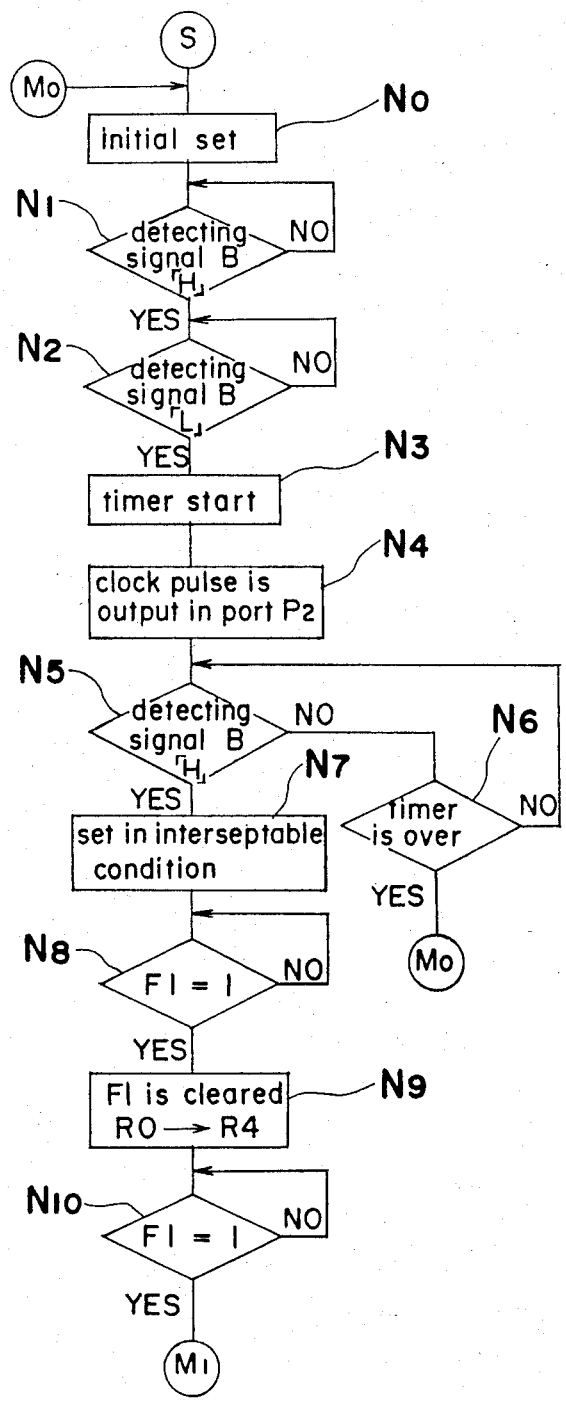
FIG. 5A through FIG. 5C are flow charts for illustrating the operation of a microcomputer to be used in the input unit.
Figure 5B:
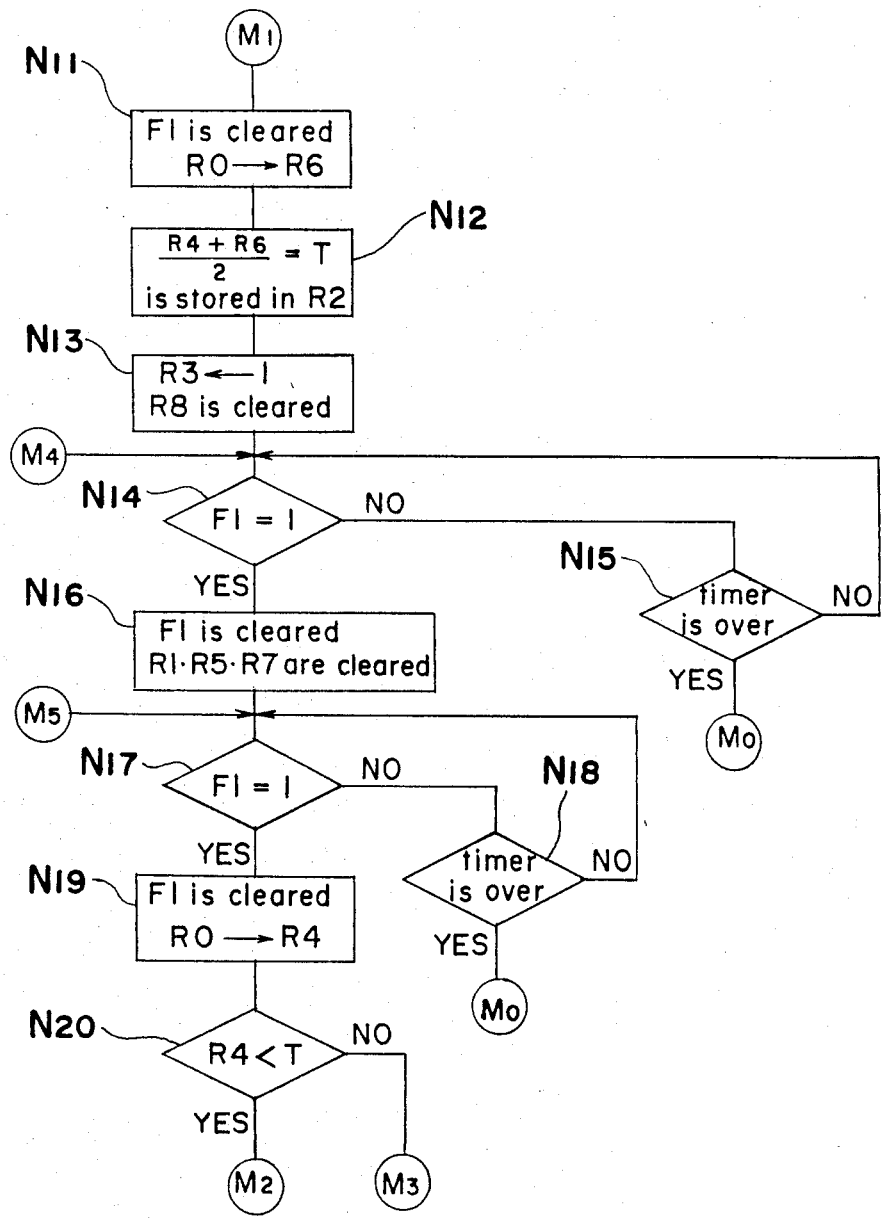
Figure 5C:
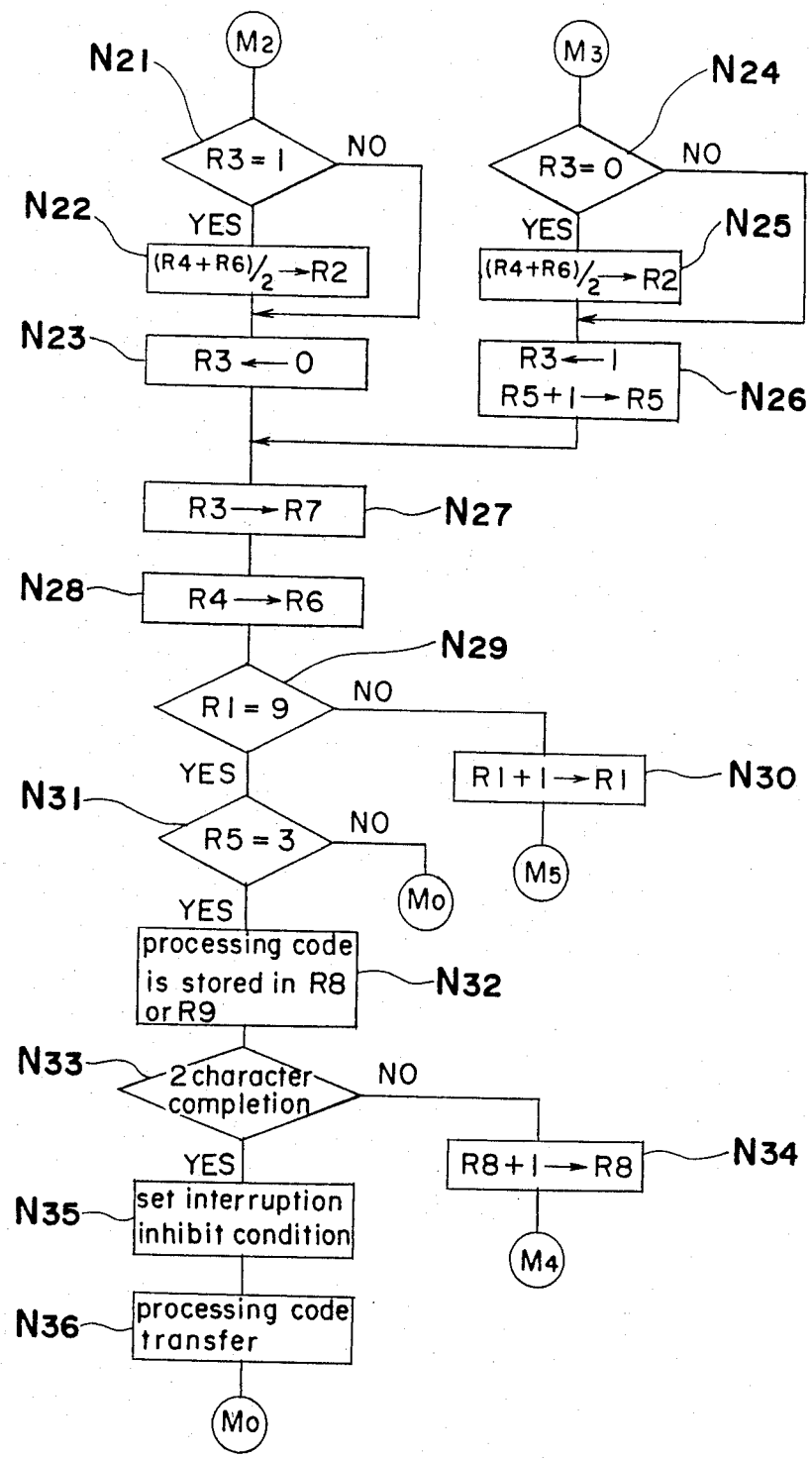

The bar code pattern detecting signal B is fed into the input portion P1 of a microcomputer (19) through an amplifier (16). The microcomputer (19) decides the size of the pulse width of the bar code pattern detecting code B to read the bar code pattern. The operation of the microcomputer (19) will be described in the flow charts from FIG. 5A through FIG. 5C. In the flow charts, R0 through R9 show registers allocated to the RAM incorporated in the microcomputer (19). F1, TC show a status register, a timer counter.

Figure 6:
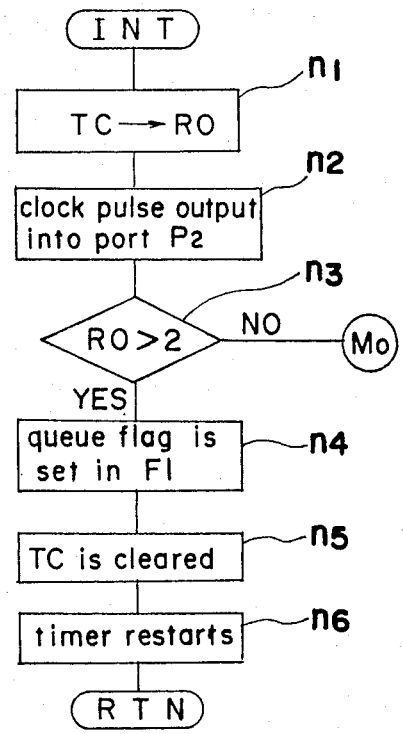
FIG. 6 is a flow chart for illustrating the operation during the interrupting operation of a microcomputer for input unit use.

For example, to scan the bar code shown in FIG. 2a by the bar code reader (4), after closing the electric power source, firstly, at the N0 step, all of timer-over flag register, status register and other registers are initially set, respectively, and at the N1 step, a bar code reader (4) detects the first bar (22) of the start character portion ST to wait for the bar code pattern detecting signal B to become "H". When the bar code pattern detecting signal B becomes "H" from the "L", at N2 step it also needs to wait for the bar code pattern detecting signal B to become "L" from "H". When the bar code reader (4) moves from the first bar (22) to the first space (23) to wait for the bar code pattern detecting signal B to become the "L", the bar code reader (4) moves to the N3 step to start the timer operation to detect the width of the first space (23). At the N4 step, a clock pulse is outputted to a port P2 to initially set the D type flip-flop (17). When the clock pulse is introduced into the D type flip-flop (17), the $\overline{Q}$ output end becomes "H". At the N5 step and N6 step, the bar code reader (4) arrives at the second bar (24) from the first spece (23) to wait for the bar code pattern detecting signal B to become the "H" from "L" and to judge whether the period of the detecting signal "L" is over or within a given time. For instance, in the timer operation, a timer counter TC calculates to add "1" by the timer interrupt at every 80$\mu$sec., and, when the count number reaches 255, that is, if 20 m sec. has passed, it is adapted to set "1" in the timer-over flag register. Therefore, when and if, at the N6 step, the timer-over flag register is detected set, it is rendered to move to the N0 step as detecting the error. When the bar code pattern detecting signal B becomes the "H" after the bar code reader (4) arrived at the second bar (24), a condition where interruption can be performed is set at the N7 step. Thus, when the bar code pattern detecting signal B becomes "H" and the D type flip-flop (17) becomes "H" at the $\overline{Q}$ output end, the EOR gate (18) outputs "L" into the INT terminal, and the microcomputer (19) is adapted to give an interruption from the outside and processes the flow during the interruption shown in FIG. 6. At the n1 step of the interruption flow, the timer counter number counted by a timer counter TC is stored at a register R0. At the n2 step, a clock pulse is outputted to the output port P2. Accordingly, the $\overline{Q}$ output end of the flip-flop circuit (17) becomes "L" and the EOR gate (18) outputs "H". At the n3 step, whether or not the count number by the timer operations exceeds 2 is decided. The count number of 2 or less is decided to be an error. The timer operation in the present embodiment adds "1" and counts it every 80$\mu$second. When the time width through which the first space (23) is passed is 160$\mu$second or less, it becomes an error. The flow chart restores to the Mo. At the n4 step, a queue flag is set in the status register F1.

At the n5 step, the timer counter TC is cleared. At the n6 step, the timer operation is re-opened on the second bar (24) and operation is restored to the main flow chart.

With the process of the interruption flow the width of the first space (23) is detected, and at the N8 step, by checking the setting of the queue flag of the status register F1 it is confirmed whether the process of the interruption flow is completed or not. When the queue flag is set, at the n9 step, the status register F1 is cleared and the count number of the timer for the first space (23) to be stored in the register R0 is transferred into the register R4.

When the bar code reader (4) reaches the character space SP1 from the second bar (24), the detecting signal B becomes "L". Also, the $\overline{Q}$ output end of the flip-flop circuit (17) is "L". In the EOR gate (18), the interruption is performed to output the "L". At the n1 step, the timer count number on the second bar (24) is stored at the register R0. At the n2 step, the clock pulse is outputted from the output portion P2. Accordingly, the Q output end of the flip-flop circuit (17) becomes "H". And at the n3 step, the contents of the register R0 are decided. At the n4 step, the queue flag is set in the status register F1. At the n5 step, the timer counter TC is cleared. At the n6 step, the timer operation on the character space SP1 starts and operation is restored to the main flow. At the N10 step, by checking the position of the queue flag, it is confirmed that the bar code reader (4) arrived at the character space SP1 from the second bar (24) to get the interruption from the outside. At the N11 step, the status register F1 is cleared and the count number of the timer concerning the second bar (24) to be stored in the register R0 is transferred into the register R6. At the N12 step, the average value (R4+R6/2) between the thin width of data (R4) to be shown by the first space (23) and the broad width of data (R6) to be shown by the second bar (24) is calculated to get a reference value T to store it at the register R2. Assume that, for instance, the width data of the first space (23), which is a narrower space, is "3", the width data of the second bar (24), which is a thicker bar is "9", and the average value becomes "6". When the subsequently provided count number is larger than "6", it is decided to be the count number of thicker bar or space. When the count number is "6" or less, it is decided to the count number of narrower bar or space. At the N13 step, the register R3 is initially set in "1", and the register R8 for counting the character number is cleared. When the bar code reader (4) reaches the first bar (25) of the data character portion DC1 from the character space SP1, the detecting signal b becomes "H". As the $\overline{Q}$ output end of the flip-flop circuit (17) is "H", the EOR gate (18) outputs "L", resulting in that the interruption occurs. At the n1 step of the interrupting operation, the timer count number of the character space SP1 is set in the register R0. The flip-flop circuit (17) renders the $\overline{Q}$ output end "L" through the output of the clock pulse of the n2 step. At the n4 step, the queue flag is set. At the n6 step, the timer operation on the first bar (25) starts and operation is restored to the main flow. At the N14 step, by checking the position of the queue flag, it is confirmed, when the bar code reader (4) arrived at the first bar (25) from the character space SP1, whether or not the process of the interruption is performed. And, if the process of the interruption from the outside is not performed and the queue flag is not set, at the N15 step it is confirmed the position of the timer-over flag.

At this time, when in accordance with the movement of the bar code reader (4) from the character space SP1 to the first bar (25) the variation of the bar code pattern detecting signal B from "L" to "H" does not exist even after the time of 20 m sec. has passed, it moves to the N0 step in order render to set the timer-over flag. At the N16 step the status register is cleared and each of registers R1, R5 and R7 ie respectively cleared.

When the bar code reader (4) reaches the first space (26) of the data character portion DC1, the detecting signal B becomes "L", the EOR gate (18) outputs the "L", due to the "L" of the $\overline{Q}$ output end of the flip-flop circuit (17), for interruption. At the n1 step of the interrupting operation, the timer count number of the first bar (25) is set in the register R0. The flip-flop circuit (17) renders the $\overline{Q}$ output end "H" through the output of the clock pulse at the n2 step. At the n4 step, the queue flag is adapted to set. At the n6 step, the timer operation on the first space (26) starts and it restores to the main flow. At the N17 step, by checking the position of the queue flag, it confirms the completion of the interruption process, and, if the outside interruption does not exist, at the N18 step, it confirms the timer-over flag. At this time, when in accordance with the movement of the bar code reader (4) from the first bar (25) to the first space (26) the variation of the bar code detecting signal B from "L" to "H" is not present even after the time of 20 m sec. has passed, the timer-over flag is set and, at the N18 step, when the variation is detected, it moves to the N0 step as an error. At the N19 step, the timer count number of the first bar (25) which has been set in the register R0 is set in the register R4. Also, at the N19 step, the queue flag is to set.

At the N20 step, it is decided whether the first bar (25) is thick or thin through comparison between the value of the register R4 and the above-described reference value T. The first bar (25) of the present example is thicker. Thus, the value of the register R4 is larger than the reference value T. The step moves to the N24 step. It is decided at the N24 step that the thicker bar has been detected at the previous time in accordance with the contents of the register R7. In this case, at the N13 step, the data of "1" is written into the register R3 and, then, it moves to the N26 step. At the N26 step, "1" is stored in the register R3 through the detection of the thicker bar and the "1" is added to the register R5 to count it. At the N27 step, after the register R7 has been shifted, the data of "1" stored in the register R3 is written onto the first bit of the register R7. At the N28 step, the timer count number on the first bar (25) as the data for correcting the reference value is stored in the register R6. And when the bar code reader (4) reaches the second bar (27) from the first space (26) of the data character portion DC1, the detecting signal B becomes "H". As the $\overline{Q}$ output end of the flip-flop circuit (17) is "H", the EOR gate (18) outputs the "L" as the interruption. At the N1 step of the interrupting operation, the timer count number of the first space (26) is set in the register R0. The flip-flop circuit (17) renders the $\overline{Q}$ output end the "L" by the output of the clock pulse in the N2 step. At the N4 step, the queue flag is set. At the N6 step, the timer operation on the second bar (27) starts, and operation is restored to the main flow. At the N29 step, according to the contents of the register R1, it is confirmed whether or not the scan for the data character portion DC1 of 9 bits is totally completed. At this time, only scanning for the first bit of the first bar (25) is performed, and, at the N30 step, the register R1 is counts the data of "1" in addition to moving to the N17 step. At the N17 step it confirms the completion of the interruption process by checking the position of the queue flag and, if the interruption from the outside is not present, at the N18 step, it confirms the timer-over flag. In this case, if and when the variation of the bar code detecting signal B from "H" to "L" in accordance with its movement from the first space (26) to the second bar (27) is not present, the time-over flag is set and, at the N18 step, when the variation is detected, the detection is treated as an error to move to the N0 step. At the N19 step, the count number of the timer to the 1st space (26) to be set in the register R0 is set into the register R4 and the status register F1 is cleared. At the N20 step, the value of the register R4 is compared with the reference value T to decide whether the first space (26) is thick or thin. The first space (26) of the present example is the thin space. Accordingly, the value of the register R4 is smaller than the reference value T and the step moves to the N21 step. At the N21 step, it is decided that the narrow bar was detected even at the previous time in accordance with the contents of the register R3. In this case, the first bar (25) detected at the previous time is the thicker bar. As the register R3 stores the "1", the step moves to the N22 step. When the narrower space (or bar) is detected like this at the previous time and the thicker bar (or space) is detected at this time, the reference value T is corrected at the N22 step. Namely, the average value between the timer count number (stored in the register R6) on the first bar (25) of the previous time and the timer count number (stored in the register R4) on the first space (26) detected this time is computed to calculate the new reference value, which is stored in the register R2. Accordingly, assume that the value of the register R6 is "9", the value of the register R4 is "4", and the corrected reference value becomes 6.5. The subsequently provided count number decides that it is the thicker bar or space, or the narrower bar or space with the "6.5" as the reference. At the N23 step, the "0" is written in the register R3 through detection of the narrower space and, at the N27 step, the register R7 is adapted to shift at one bit and the data of the register R3 is written into the first bit of the register R4. At the N28 step, the time count number of the first space (26) detected at this time is stored in the register R6. When the bar code reader (4) reaches from the second bar (27) of the data character portion DC1 to the second space (28), the detecting signal B becomes "L". The EOR gate (18) outputs the "L" as the interruption, because the $\overline{Q}$ output end of the flip-flop circuit (17) is "L". At the N1 step of the interrupting operation, the timer count number of the second bar (27) is set in the register R0. The flip-flop circuit (17) renders the Q output end "H" through the output of the clock pulse in the N2 step. At the N4 step, the queue flag is set. At the N6 step, the timer operation on the second space (28) starts and it restores to the main flow. When it is confirmed at the N29 step, the scanning of the data character portion is not completed, by the value of the register R1 at the N29 step, "1" is added to the register R1. The step becomes the N17 step. At the N17 step, it confirms the completion of the interruption process by checking the position of the queue flag and, if the interruption is from the outside, the position of the timer-over flag is confirmed. In this case, if and when the variation of the bar code detecting signal B from "H" to "L" in accordance with its movement from the second bar (27) to the second space (28) is not present, the timer-over flag is set and, at the N18 step, it is moved to the N0 step, treating it as an error, through the detection of it. At the N19 step, the status register F1 is cleared, and the count number of the timer for the second bar (27) to be set in the register R0 is stored in the register R4. At the N20 step, the value of the register R4 is compared with the previously corrected reference value T to decide whether the second bar (27) is thicker or narrower. The second bar (27) is the narrower bar and the value of the register R4 is smaller than the reference value T. As the step moves to the N21 step, as the first space (26) detected this time is narrower, the "0" is stored in the register R3, and the step becomes the N23 step from the N21 step. Accordingly, when the narrower space (or bar) was detected at the previous time and the narrower bar (or space) is detected this time, or when the thicker bar (or space) was detected at the previous time and the thicker space (or bar) is detected this time, the reference value T is not corrected. At the N23 step, "0" is written in the register R3 through detection of the narrower bar. At the N27 step, the register R4 is adapted to shift at one bit and the "0" in the register R3 is written in the first bit of the register R7. At the N28 step, the timer count number of the second bar (27) detected this time is stored in the register R6. When the bar code reader (4) reaches the third bar (29) from the second space (28) of the data character portion DC1, the detecting signal B becomes "H". The EOR gate (18) outputs the "L" as the interruption, because the $\overline{Q}$ output end of the flip-flop circuit (17) is "H". At the n1 step of the interrupting operation, the timer count number of the second space (28) is set in the register R0. The flip-flop circuit (17) renders the $\overline{Q}$ output end the "L" through the outputting of the clock pulse in the n2 step. At the N4 step, the queue flag is adapted to set. At the n6 step, the timer operation on the third bar (29) starts and it restores to the main flow. Every time the bar code reader (4) moves from the bar to the space and from the space to the bar like this, the interruption is provided. The reading of the timer count number and the starting of the next timer operation are performed. In the main flow, the size in width of the bar or space is decided in accordance with the loaded timer count number to convert the data character portion DC1 into the BC code. And when the bar code reader (4) reaches the character space portion SP2 from the final bar (30) of the data character portion DC1, the detecting signal B becomes "L". Th EOR gate (18) outputs "L" as the interruption, because the $\overline{Q}$ output end of the flip-flop circuit (17) is "L". At the n1 step of the interrupting operation, the timer count number of the final bar (30) is set in the register R0. Th flip-flop circuit (17) renders the Q output terminal the "H" through the outputting of the clock pulse in the n2 step. At the n6 step, the timer operation on the character space SP2 starts and it restores to the main flow.

A series of processings from the N14 step to the N28 step on the final bar (30) of the data character portion DC1 are performed and, at the N26 step, "1" is written in the register R3. At the N27 step, the data of "1" already stored in the register R3 is written into the first bit of the register R7 which has been shifted one bit in advance. At this time, the data "1" on the first bar (25) is carried out due to existing 8 bits in the register R7. The bar code of 9 bits means the conversion into the BC code of 8 bits, because the register R7 has only the data from the first space (26) to the final bar (30) stored therein. Accordingly, the bar code pattern of the data character portion DC1 shown in FIG. 2a is detected by the BC code (100001001) of 9 bits, but is stored, by the BC code (00001001) of 8 bits, in the register R7. At the N26 step, the "1" is added to and counted in the register R5, because the final bar (30) is the thicker bar. And at the N31 step, it is confirmed that the value of the register R1 has reached "9" to complete the scanning of the data character portion DC1, and the step moves to the N31 step. As the bar code in the present invention includes three thicker bars or spaces in one character, the value of the register R5 is "3" when the scanning of the one character has been completed. Accordingly, as it is found out at the N31 step that the value of the register R5 is a value except for the "3", the flow as an error is restored to Mo. Att the N32 step, the BC code of 8 bits stored in the register R7 is converted into the other BC code of 8 bits (hereinafter referred to as processing code), and is stored in the register RA. FIG. 7 shows a conversion table into the processing code from 9-bit code or 8-bit code. The bar code pattern, shown in FIG. 2a, consisting of the 9 bit code (100001001) and 8 bit code (00001001) becomes (00001010) in the processing code, i.e., 0A in hexadecimal code. The processing code is represented in hexadecimal code as shown in the conversion table of FIG. 7. However, one bar code pattern of the present example is composed of 2 characters and, at the N33 step, in accordance with the contents of the register R8 it is decided whether or not the detection of 2 characters is completed. In this case, the register R8 is "0" and, at the N34 step, the data of "1" is counted in the register R8 in addition to moving to the N14 step.

On the other hand, when the bar code reader (4) reaches the first bar (31) of the data character portion DC2, the detecting signal B becomes "H". As the $\overline{Q}$ output end of the flip-flop circuit (17) is "H", the EOR gate (18) outputs "L" as the interruption. In the interrupting operation, the count number by the timer counter TC of the character spacer SP2 is set in the register R0 and the timer operation on the first bar (31) starts, and operation is restored to the main flow. At the N14 step, by checking the position of the queue flag the completion of the interruption process is confirmed and, if the interruption from the outside is not present, at the N15 step, the step is moved to the N0 step in the case of timer-over after the confirmation of the position of the timer-over flag. At the N16 step, the status register F1 is cleared and simultaneously the registers R1, R5, R7 are also cleared.

And as the bar code reader (4) scans the data character portion DC2, the same processing as during the scanning of the data character portion DC1 is performed by the microcomputer (19). The bar code pattern of the data character portion DC2 is detected in the BC code (100100001) of 9 bits, but the BC code (00100001) of 8 bits is stored in the register R7. The N32 step converts the 8-bit code into the process code 01 to store it in the register RB. At the N33 step, it is confirmed that the process codes of 2 characters have been respectively detected. At the N35 step, the condition is set into an interruption inhibit condition. At the N36 step, two process codes 0A, 01 stored in the registers RA, RB are transferred to the controlling circuit (2) of an automatic vending machine and it is restored to the MO. The process codes show a given operating order and a setting information to the automatic vending machine. The controlling circuit (2) decodes the contents of the process code through inputting of the process code. FIG. 8A through FIG. 8E represent the contents of each operating instruction and each setting information indicated in two process codes. The user of the automatic vending machine orders, by the operating instructions, sale money-amount display operation, sale-number display operation, sale-number display operation for each column, sale money-amount display operation for each column, etc. to the automatic vending machine. Also, the setting information is one necessary for the automatic vending machine in achieving the sale operation. There is information as to sale type such as single vending or plural vending or as to selling prices.

Figure 9:
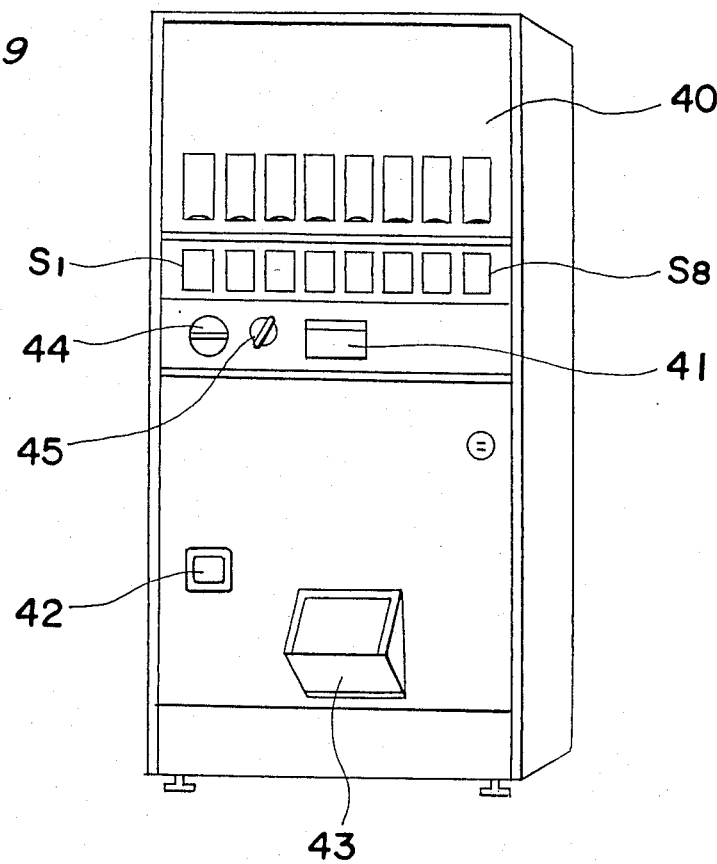
FIG. 9 is a perspective view of an automatic vending machine.
Figure 10:
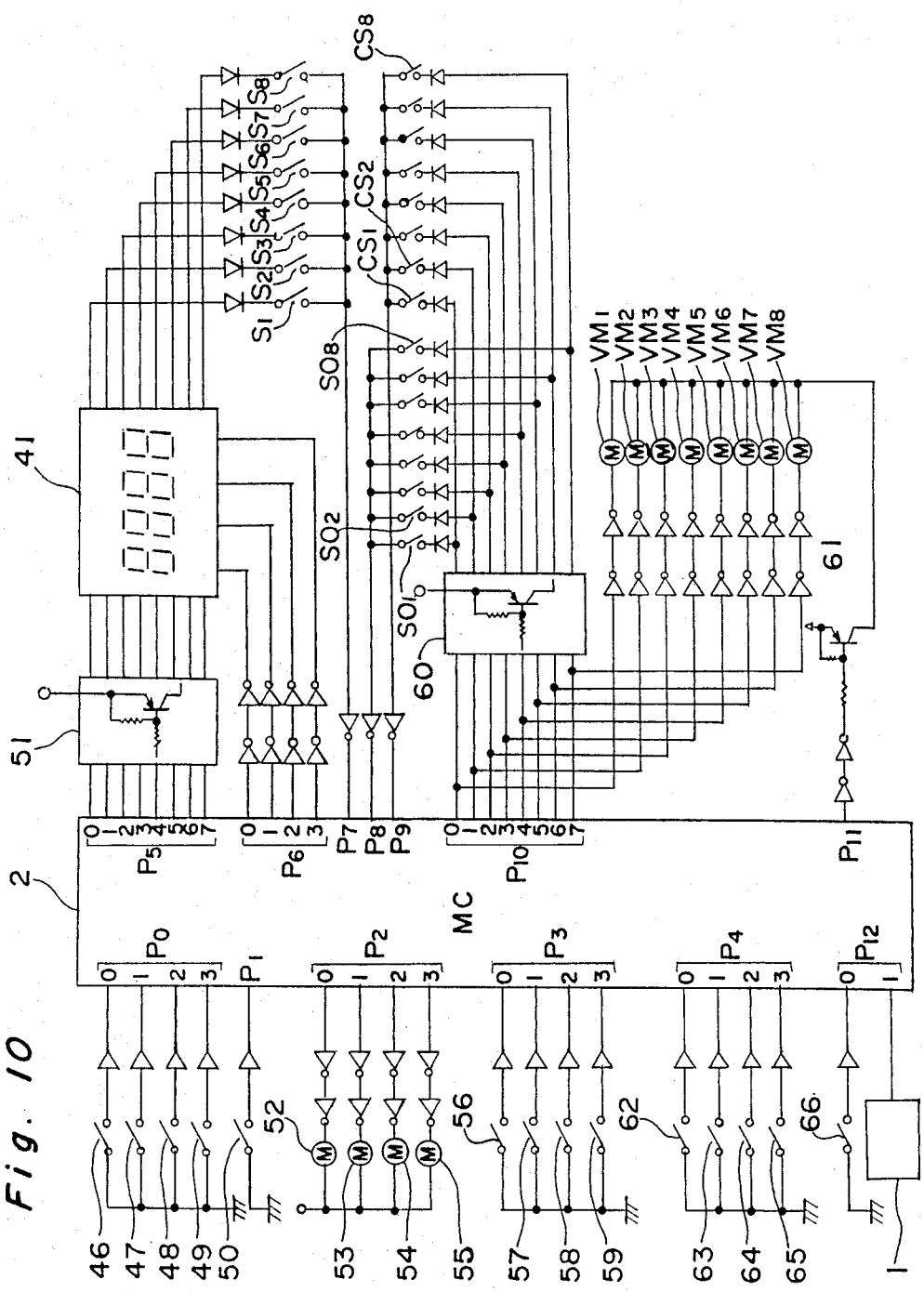
FIG. 10 is an electric circuit diagram of a controlling circuit of an automatic vending machine provided with an input unit in accordance with the present invention.

FIG. 9 shows the appearance of an automatic vending machine having eight sale columns. The front-face panel (40) has eight selection switches (S1), (S2) through (Sn) corresponding to each sale column, a display unit (41), a coin return opening (42), a commodity delivery opening (43), a coin slot (44), a coin return lever (45) disposed thereon. FIG. 10 shows a circuit diagram of an automatic vending machine provided with an input unit (1) of the present invention. The controlling circuit (2) is composed of a microcomputer MC to be operated in accordance with the predetermined program. Coin switches (46), (47), (48), (49) are connected, in accordance with coin kinds of 500 yen, 100 yen, 50 yen, 10 yen in Japanese currency, with an input port P0. A coin return switch (50) which turns on and off through the operative cooperation with the return lever (45) is connected with an input port P1. Change motors (52), (53), (54), (55) for paying the coins are connected, for each of 500 yen, 100 yen, 50 yen, 10 yen, with the output port P2. Cam switches (56), (57), (58), (59), which turn on and off through the operative cooperation with change motors (52), (53), (54), (55), are connected with an input port P3. Coins for change paying use are accommodated in the coin pipe (not shown) for each of the coin kinds. The wiper, for discharging the coins, disposed in each pipe is driven by change motors (52), (53), (54), (55) to slide the under portion of the coin pipe so that the lowermost one of the accommodated coins may be pushed out. And cam switches (56), (57), (58), (59) are normally in their inoperative positions and turn on due to the driving start of the corresponding change motors (52), (53), (54), (55). When the respective motors (52), (53), (54), (55) perform their rotations necessary to paying one coin, the cam switches turn off. Empty switches (62), (63), (64), (65), which are adapted to detect the existence of the accommodated coins in the coin pipe for each of change coin kinds are connected with an output port P4. A driving circuit (51) is connected with an output port P5. A display unit (41) is connected between the driving circuit (51) and the output port P6. Selection switches (S1), (S2) through (S8) are connected between the driving circuit (51) and the input port P7. Vending motors (VM1), (VM2) through (VM8), for discharging the commodities, corresponding to the sale columns, and a driving circuit (61) are connected between the output port P10 and the output port P11. Sold out switches (SO1), (SO2) through (SO8) for detecting the sold-out commodity for each of the sale columns are connected between the input port P8 and the driving circuit (60) to be connected to the output port P10. Cam switches (CS1), (CS2) through (CS8) which turn on and off through the operative cooperation with the vending motors (VM1), (VM2) through (VM8) are connected between the driving circuit (60) and the input port P9. The cam switches (CS1), (CS2) through (CS8) are normally in their inoperative positions as the above-described cam switches (56), (57), (58), (59) are. The cam switches turn on due to the driving start of the corresponding vending motors (VM1), (VM2) through (VM8). As the respective motors (VM1), (VM2) through (VM8) perform their rotations necessary for discharging one commodity, the cam switches turn off. The input port P12 is connected with an input mode specifying switch (66) which specifies an input unit (1) and an input mode from the input unit (1).

Figure 11:
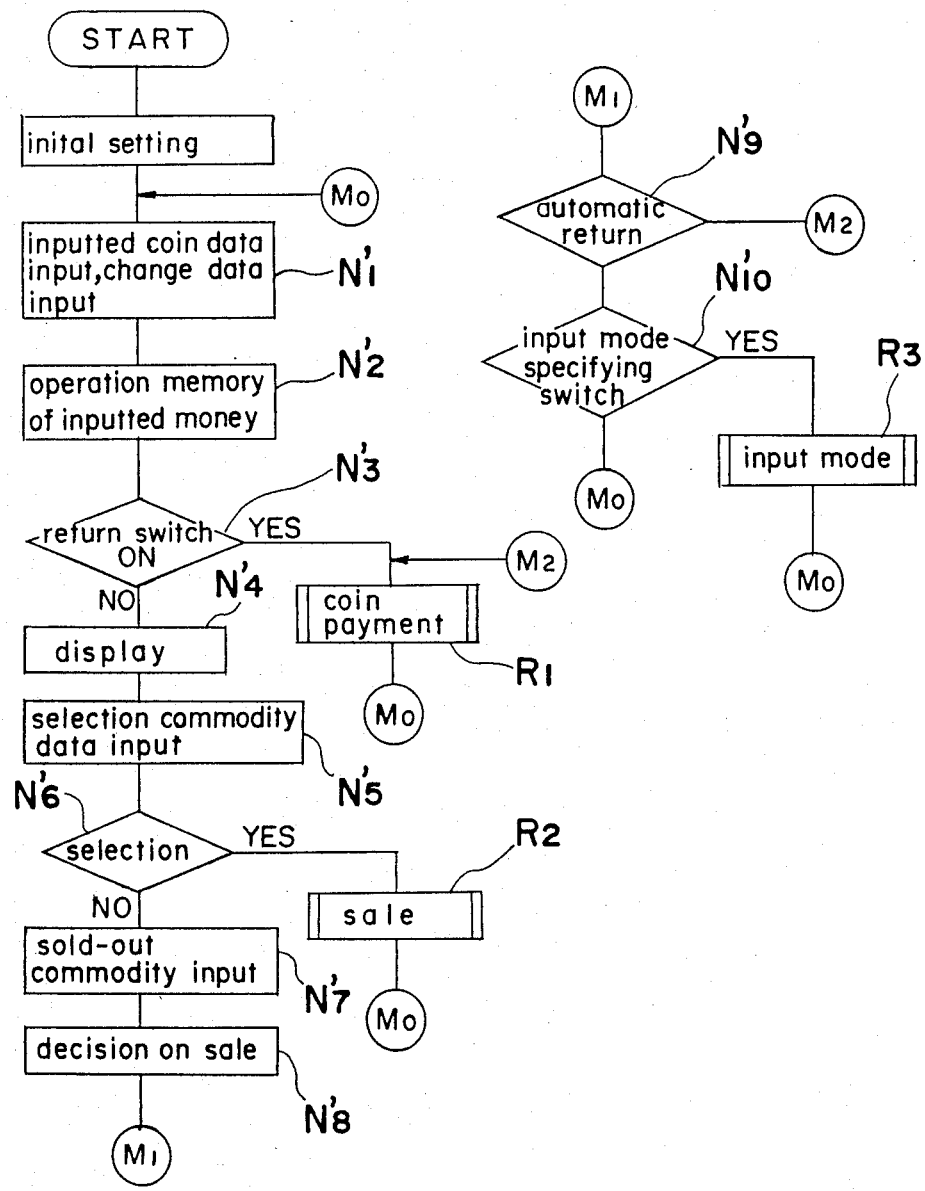
FIG. 11 is a flow chart for illustrating the operations of a microcomputer for controlling an automatic vending machine.

FIG. 11 is a flow chart showing the schematic operation of the microcomputer MC. The microcomputer MC completes the given initial setting after the power supply has been put to work. At the N'1 step, inserted coin data by coin switches (46), (47), (48), (49) is inputted from the input port P0 and change-existence data by change coin detecting switches (62), (63), (64), (65) is inputted from the input port P4. At the N'2 step, the inputted money-amount is calculated and stored in accordance with the inserted coin data inputted. At the N'3 step, the output of the coin return switch (50) is inputted from the input port P1. When the coin return switch (50) is turned on, and the inputted level is "L", the controlling of the subroutine R1 of the coin payment is effected, the step returns to the N'1 step. At the subroutine R1, the type and number of the coins to be paid out in accordance with the inserted money-amount are determined. The ouput port P2 is made "L" with respect to the change motors (52), (53), (54), (55) corresponding to the coin kind to be paid. When the outputs of the cam switches (56), (57), (58), (59) corresponding to the change motors (52), (53), (54), (55) driven by the input port P3 become "H" from "L" and become "L" again from "H", the output port P2 is made "H" from "L". And the controlling operation of the change motors (52), (53), (54), (55) is performed in accordance with the coin kind and number to be paid. When the inserted money-amount becomes "0" yen due to subtraction of the paid coin amount, the processing of the subroutine R is over. At the N'4 step, the inputted money-amount is displayed on the display unit (41) and segment data are inputted from the output port P5 while the digit signal is outputted to the output port P6 to perform the display control. At the N'5 step, each of the terminals 0 through 7 of the output port P5 is sequentially rendered "H". The selected commodity data through the selection switches (S1), (S2) through (S8) are inputted by the input level of the input port P7. At the N'6 step, the selection switch operated in accordance with the selected commodity data is detected. If the input port P7 becomes the "L" when the terminal 5 of the output port P5 has been made "H", the microcomputer MC detects the action of the selection switch (S6) to process the subroutine R2 of the sale. In the subroutine R2, the terminal 5 of the output port P10 is made "L" and the output port P11 is made "H" to drive the vending motor (VM6). When the input port P9 becomes "H" again by the OFF, ON, OFF of the cam switches (CS6), the output port P11 is made "L" to stop the vending motor (VM6). Also, the microcomputer MC has the selling prices for each commodity kind inputted and stored in the RAM therein by the inputting unit (1), and in the subroutine R2, the selling prices of the commodities sold are subtracted from the inputted money amount. The processing of the subroutine R2 is finished and then the step is restored to the N'1 step. However, when any commodity selection switches are in their inoperative positions, the microcomputer MC is put into the N'7 step. Each terminal of the output port P10 is sequentially made "H" to input the sold-out data of the commodity through the sold-out switches (SO1), (SO2) through (SO8) in accordance with the input level of the input port P8. At the N'8 step, purchaseable commodities are determined in accordance with the inputted money amount (or the remaining amount after the sales), the selling price of each commodity kind, the change existence data, the sold-out data of the commodities. At the N'9 step, the requirement of the automatic refundment is checked. When the automatic refundment is required, it moves to the subroutine R1 to control the payment of the money amount to be refunded. The automatic refundment consists of change payment in a case where the purchaseable commodities are not available with the remaining money amount left after the sales, and excess money returns in a case where the inputted money amount has exceeded the maximum input amount. The N'10 step is adapted to detect the ON of the input-mode specifying switch (66) by the input level of the terminal 0 of the input port P12. When the input level of the terminal 0 becomes "L" through the ON of the input-mode specifying switch (66), it moves to the subroutine R3 to put the microcomputer MC in the input mode. The subroutine R3 decodes the processing code to be introduced from the inputting unit (1) to the terminal 1 of the input port P12 to perform the given processing, but the input mode is released by the OFF of the input mode specifying switch (66) and the step moves to the N'1 step.

A concrete embodiment of a bar sheet with a bar code pattern printed thereon will be provided to describe the operation of the inputting unit (1) in the input mode. FIG. 12 shows a bar sheet (70) when the selling prices of the commodities are set in the automatic vending machine. A "selling price setting" displayed title display portion (71), a column display portion (72) wherein the display of the sales columns is properly shown with direct-vision readable numerals, alphabet letters, etc., a column bar code display portion (73) provided corresponding to the column display portion (72) and adapted to be displayed in the bar codes to mean the corresponding column, a selling price display portion (74) wherein the kinds of the selling prices are properly displayed with direct-vision readable numerals, the combination of the numberals and the coin unit displays, and letters, a selling price bar code display portion (75) provided corresponding to the selling price display portion (74) and adapted to be displayed by the bar codes to mean the corresponding selling prices are described on the sheet (70). Also, an operation procedure display portion (76) displaying the operating procedure of the bar code reader (4) is added to the sheet (70) for convenience of the operation. The bar sheet (70) of the present example is written in numerals ranging from 1 through 8 with respect to eight sales columns of the automatic vending machine. As shown in FIG. 8A through FIG. 8D, the inputting unit (1) has processing codes set so that 32 sales columns may be specified. Accordingly, now that the number of the sales columns is 32, the prices of any automatic vending machines can be set. To set the selling prices on the microcomputer MC, which is the controlling circuit (2) of the automatic vending machine, by such bar sheet (70) as described hereinabove, the surface of the column bar code display portion (72) corresponding to the column No. 1 is swiftly rubbed from left to right by the bar code reader (4) and then the surface of the selling price bar code display portion (75) corresponding to 70 yen of the selling price display portion (74) is swiftly rubbed from left to right by the bar code reader (4) to set the column 1 to the selling price of 70 yen.

Figure 13:
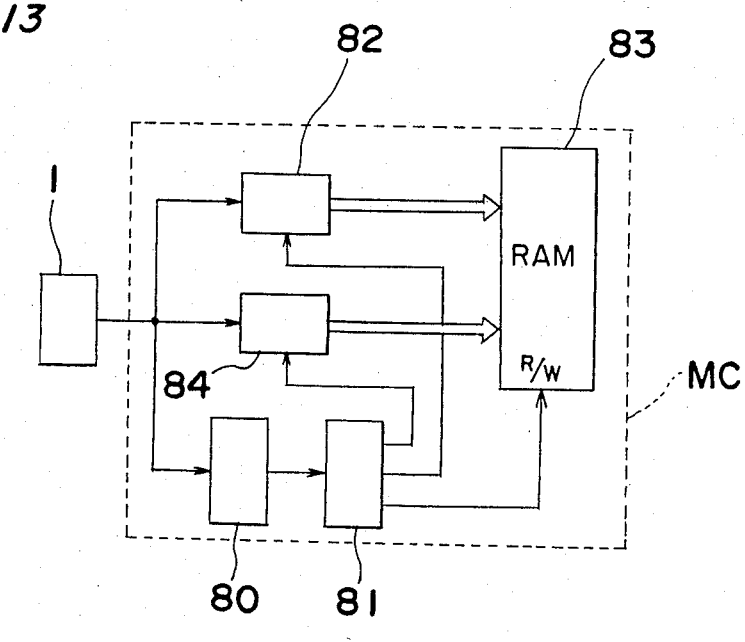
FIG. 13 is a functional block diagram for illustrating the microcomputer during the inputting of the selling prices.

FIG. 13 is a functional block diagram for describing the operation of the microcomputer MC in setting the selling prices in the RAM (83) within the microcomputer MC by the bar sheet (70). To set the column No. 5 to 220 yen, rub the bar code (73A) by the bar code reader (4). At this time, the inputting unit (1) transfers the processing codes 0B, 04 to the microcomputer MC. In the microcomputer MC, the instruction decoder (80) decodes that the 0B, 04 are instruction codes for setting the price to the sales column No. 5, and the controlling unit (81) outputs the controlling signal to an address encoder (82), a storing signal to the RAM (83). By the inputting of the controlling signal, the address encoder (82) specifies the address for the RAM (83) memorizing the selling price of the sales column No. 5 in accordance with the processing codes 0B, 04. Then, rub the bar code (75A) by the bar code reader (4), and the inputting unit (1) transfers the processing codes 02, 02 to the microcomputer MC. When the instruction decoder (80) decodes that the processing codes are the data showing the selling prices, the controlling unit (81) outputs the controlling signal to a decimal conversion unit (84). Accordingly, the decimal conversion apparatus (84) converts the 02, 02 into the decimal code 22. The RAM memorizes 00100010 in 1 byte. When the processing codes 02, 0A showing the selling price data 1,200 yen are transferred from the inputting unit (1) though it is not shown in the bar code, the decimal conversion unit (84) converts it into the decimal code 120. The RAM (83) memorizes 00000001·00100000 in 2 bytes.

Figure 14:
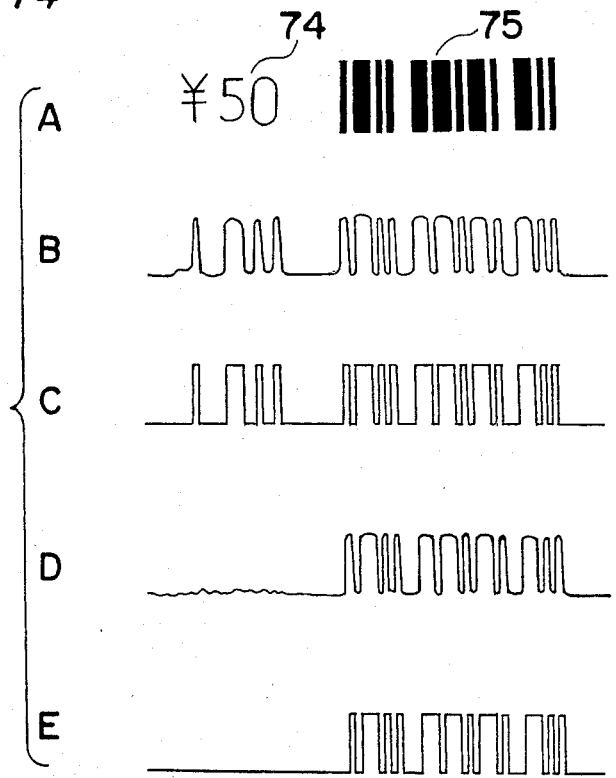
FIG. 14 shows signal wave-form views in a case where a bar code and a portion with selling prices are expressed thereon are rubbed by a bar code reader.

Column numbers (72), selling prices (74) are respectively described, in a readable condition, close to the bar code display portions (73), (75) on the bar sheet (70). When these readable display portions are the same in color as the black bar of the bar code display portion or close in color to the black, the reflection amount of the infrared light to be illuminated from the infrared LED (9) is almost the same in level as the black bar. The 50 yen which is a direct-vision readable display portion, and a bar code display portion (75) located on the right side of the 50 yen are scanned as a series as shown in the A of FIG. 14 by mistake by the bar code reader (4). The output of a current-voltage converting circuit (5) becomes the B in the same FIG. 14 and the output of a wave-form shaping circuit (6) becomes the C of the same FIG. 14. A high level of output as in the portion of the black bar is produced in the portion of 50 yen so that the correct information cannot be read in a processing unit (7).

According to the present invention, the direct-vision readable display portion is described in a color, for example, blue or red which is greatly different in the light reflection amount from the black bar, and provides almost the same reflection light amount as the space between the black bars as shown as the same FIG. 14D. If the portion of the 50 yen is scanned by the bar code reader (4) as described hereinabove, the output of the current-voltage conversion circuit (5) is kept low in level as shown in the same FIG. 14D and the output of the wave-form shaping circuit (6) keeps its low level as in the space between the black bars as shown in the FIG. 14E. Thus, the processing unit (7) can correctly read the information of the bar code display portion (75) only.

Figure 15:
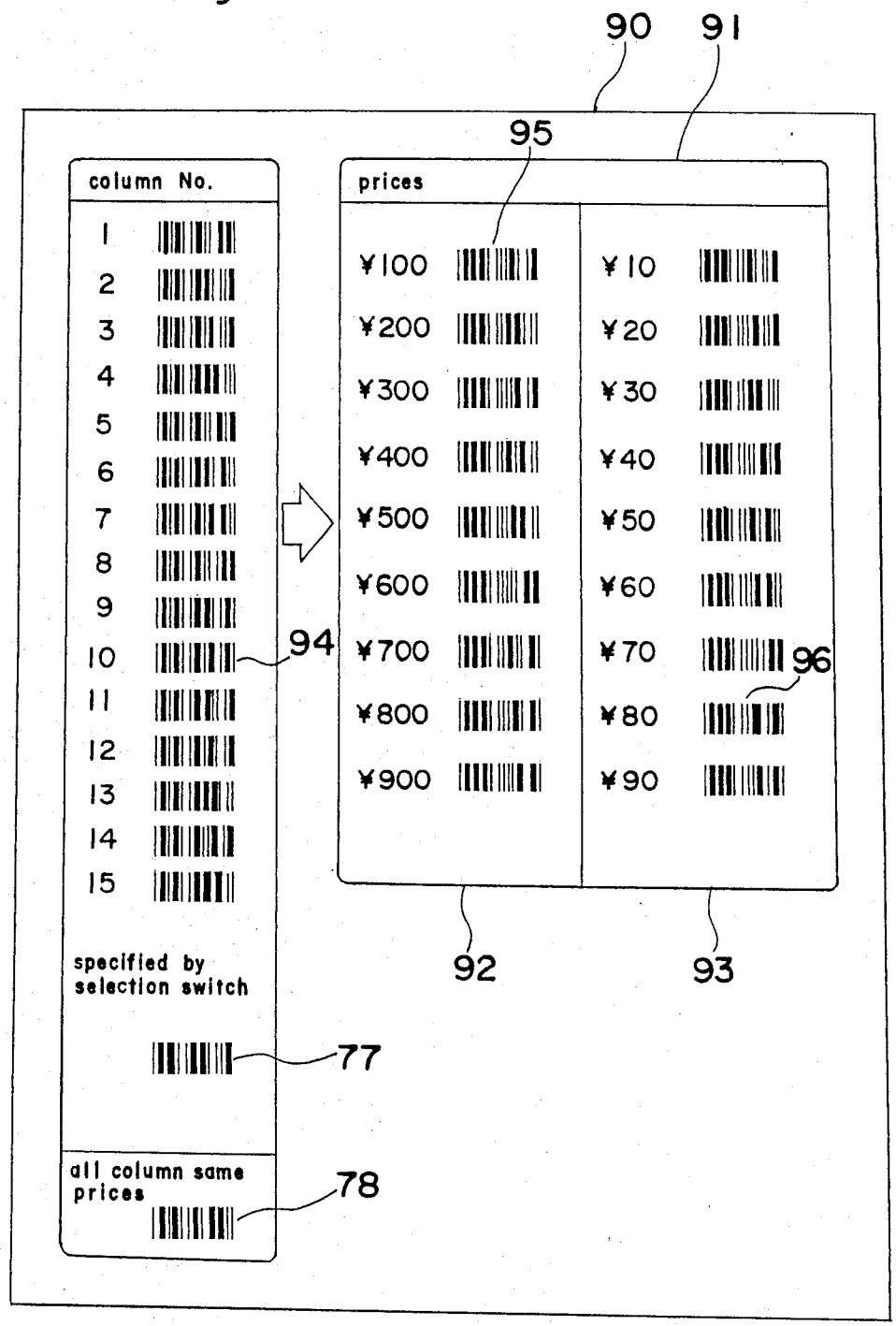
FIG. 15 is a sketch view showing another example of a bar sheet to be used in selling price input.

FIG. 15 shows a bar sheet (90) in setting in the RAM (83) the selling prices by the other method. The selling price bar code display portion (91) of the sheet (90) is composed of 100 yen through 900 yen bar code display portion (92) showing the price of each 100 yen ranging from 100 yen to 900 yen, and 10 yen through 90 yen bar code display portion (93) showing the price of each 10 yen ranging from 10 yen to 90 yen. For example, the operation of the microcomputer MC in setting the sales column No. 10 to 180 yen will be described in FIG. 13. First, rub the bar code (94) by the bar code reader (4), and the inputting unit (1) transfers the processing codes 0B, 09 to the microcomputer MC. Accordingly, the instruction decoder (80) decodes that the processing code is an instruction code for setting the price to the sales column No. 10. The controlling unit (81) outputs a controlling signal to an address encoder (82) and a storing signal to the RAM (83), respectively. And the address encoder (82) specifies an address of the RAM (83) wherein the selling price of the sales column No. 10 is stored in accordance with the processing codes 0B, 09. Rub the bar code (95) against the bar code reader (4) and the inputting unit (1) transfers the processing code 0C, 0B to the microcomputer MC. The processing codes 0C, 0B show clearing of the contents of an address for memorizing the data of 100 yen data and 10 yen data. If the decoding operation is performed by the instruction decoder (80), the controlling unit (81) outputs the controlling signal to the decimal converting unit (84). Accordingly, the decimal converting unit (84) converts the 0C, 0B into the decimal code 10 to output it. 00010000 is stored in the specified address of the RAM. And furthermore, rub the bar code (96) by the bar code reader (4) and the inputting unit (1) transfers the processing codes 0C, 08 to the microcomputer MC. When the instruction decoder (80) decodes that the processing codes 0C, 08 show 80 yen, the controlling unit (81) outputs a controlling signal to the decimal converting unit (84). Accordingly, as the decimal converting unit (84) converts it into a decimal code 8, 8 is added to the lower 4 bits of the specified address of the RAM (83) so that 00011000 is memorized in 1 byte.

Figure 16:
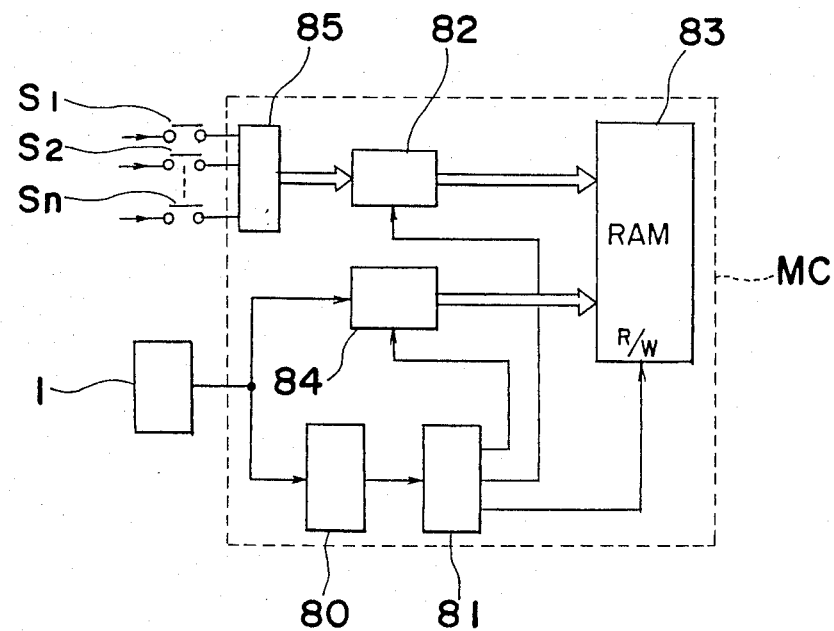
FIG. 16 is a functional block diagram for illustrating the operations of a microcomputer in a case where a sales column into which a selling price is inputted has been specified by a selection switch.

Also, specification of the sales column for setting the selling prices can be performed by not only the bar code, but also the commodity selection switches provided on the automatic vending machine. In this case, the bar codes (77) showing the price setting of the sales column to be specified by the selection switches are provided on the bar sheets (70), (90) of FIG. 12 and FIGS. 15. FIG. 16 is a functional block diagram for describing the operation of the microcomputer MC in a case wherein the sales column is specified, by the action of the selection switches, to set the selling price. Rub the bar code (77) by the bar code reader (4) and the inputting unit (1) transfers the processing codes 0A, 01 to the microcomputer MC. The V instruction decoder (80) decodes that it is the price setting of the sales column to be specified by the selection switch. The controlling unit (81) outputs a controlling signal to an address encoder (82), a storing signal to the RAM (83). Accordingly, when some selection switches (S1), (S2) through (S8) corresponding to the sales column to be price-set are operated to input the selection commodity data to an input port (85), the address encoder (82) specifies the address of RAM (83) which stores the selling prices of the sales column corresponding to the selection switch operated. Thereafter, rub, with the bar code reader (4), the bar code showing the optional selling prices of FIG. 12 or FIG. 15 to transfer the processing codes from the inputting unit (1), and the instruction decoder (80) decodes that it is the selling price data and the controlling unit (81) outputs the controlling signal to the decimal converting unit (84). Thus, the decimal converting unit (84) converts the processing codes into decimal codes to introduce them to the RAM (83) to set the prices.

Figure 17:
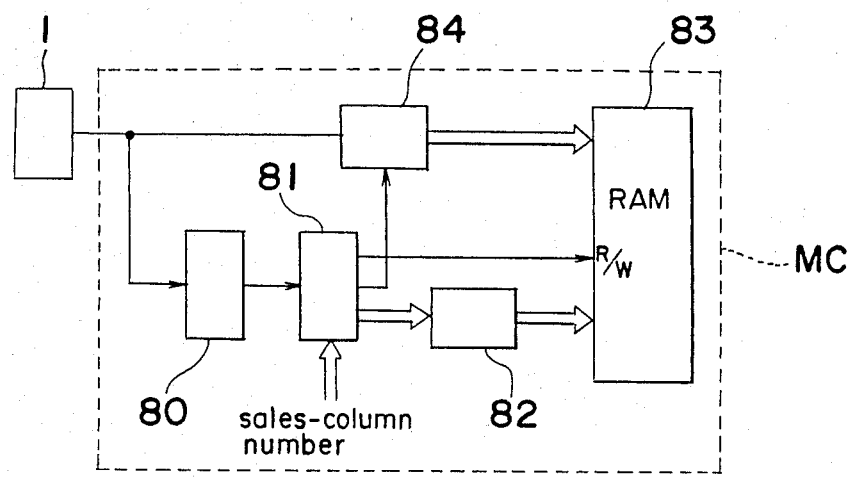
FIG. 17 is a functional block diagram for illustrating the operation of the microcomputer when each of the sales columns is all set into the same price.

In addition, bar codes (78) showing that all the sales columns set the same selling prices are provided on the bar sheets (70), (90) of FIG. 12 and FIG. 15. FIG. 17 is a functional block diagram for explaining the operation of the microcomputer MC in a case wherein all the selling columns are set into the same selling prices. Rub the bar code (78) with the bar code reader (4) and the inputting unit (1) transfers the processing codes 0B, 23 to the microcomputer MC. When the instruction decoder (80) decodes that it is the same selling price setting of all the sales columns, the controlling unit (81) introduces the number of the predetermined sales columns and outputs a storing signal to the RAM (83). Also, the controlling unit (81) outputs a controlling data into the address encoder (82). The address encoder (82) specifies the address of the RAM (83), which memorizes the selling prices of the sales column No. 1, in accordance with the controlling data. The bar codes showing the optional selling prices of FIG. 12 or FIG. 15 are rubbed by the bar code reader (4) and the inputting unit (1) transfers the processing code. The controlling signal is inputted from the controlling unit (81) through the decoding by the instruction decoder (80). The decimal converting unit (84) converts the processing codes into the decimal codes to introduce them to the RAM (83). Then, the controlling apparatus (81) outputs the controlling data on the sales column No. 2 to the address encoder (82) to specify the following address of the RAM (83). The decimal converting unit (84) introduces the same decimal code to the RAM (83). The controlling unit (81) repeats such operation in accordance with the number of the sales columns so that all the sales columns are set into the same prices.

Figure 18:
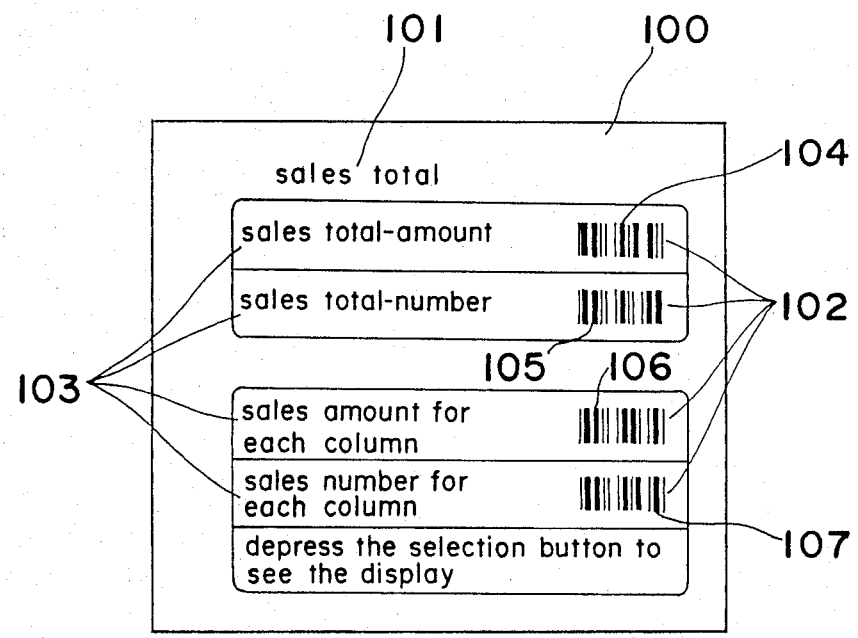
FIG. 18 is a sketch view showing the other example of a bar sheet for use in operation order input.

FIG. 18 shows a bar sheet (100) expressing the operation order on the sales total. A sales-amount display order, a sales-number display order, a sales-amount display order for each column, a sales-number display order for each column are provided as the operation orders for the sales total. The bar sheet (100) is composed of a title display portion (101), a bar code display portion (102) for describing the operation order contents in the bar codes, a direct-vision readable display portion (103) represented, in such letters as the contents of the bar code information can be read through the direct-vision corresponding to the bar code display portion. Even in this case, in the direct-vision readable display portion (103), the output of the wave-form shaping circuit (6) is described in a color wherein the output almost similar to the space of the bar code is provided. Each time the automatic vending machine vends the commodities, the microcomputer MC adds, to the interior memories, the sales money-amount, the sales number, the sales money-amount of the columns sold, and the sales number of the columns sold, and counts them. But when the bar code showing the given operation order is rubbed with the bar code reader (4) and the processing code is transferred from the inputting unit (1), the microcomputer MC reads the specified digital data from the memory to display them on the display unit (41). The bar code (104) of FIG. 18 expresses 0A, 06 in the processing codes. This orders the sales money-amount display operation. The microcomputer MC reads the sales total-amount data, which are stored in the memory through the inputting of the processing codes 0A, 06 to display them on the display unit (41). The bar code (105) expresses 0A, 09 in the processing code to order the sales-number display operation. The microcomputer MC reads the sales total-number data stored in the memory to display them on the display unit (41). Also, the bar code (106) expresses 0A, 08 in the processing code. This orders the sales money-amount display operation for each column. When the processing codes are inputted, the microcomputer MC reads from the memory the sales money-amount data of the columns corresponding to the subsequently operated selection switches (S1), (S2), ... (S8) to display them on the display unit (41). Furthermore, the bar code (107) expresses 0A, 09 in the processing code. This orders the sales number display operation for each column. When the processing codes are inputted, the microcomputer MC reads from the memory the sales number data of the column corresponding to the subsequently operated selection switches (S1), (S2), ... (S8) to display them on the display unit (41).

Figure 19:
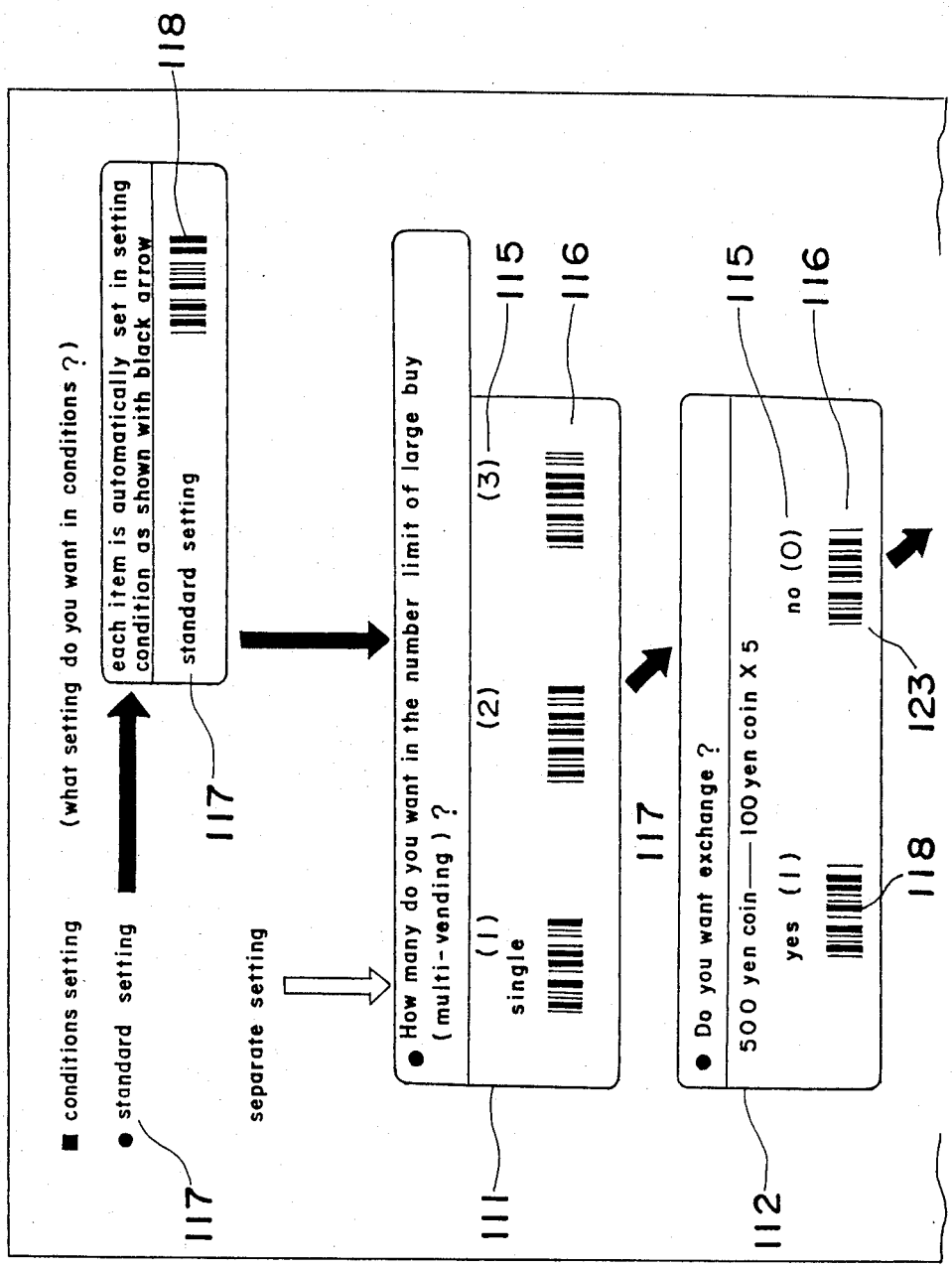
FIG. 19A and FIG. 19B are sketch views showing the further example of a bar sheet for use in a set information input except for the selling price input.
Figure 19B:
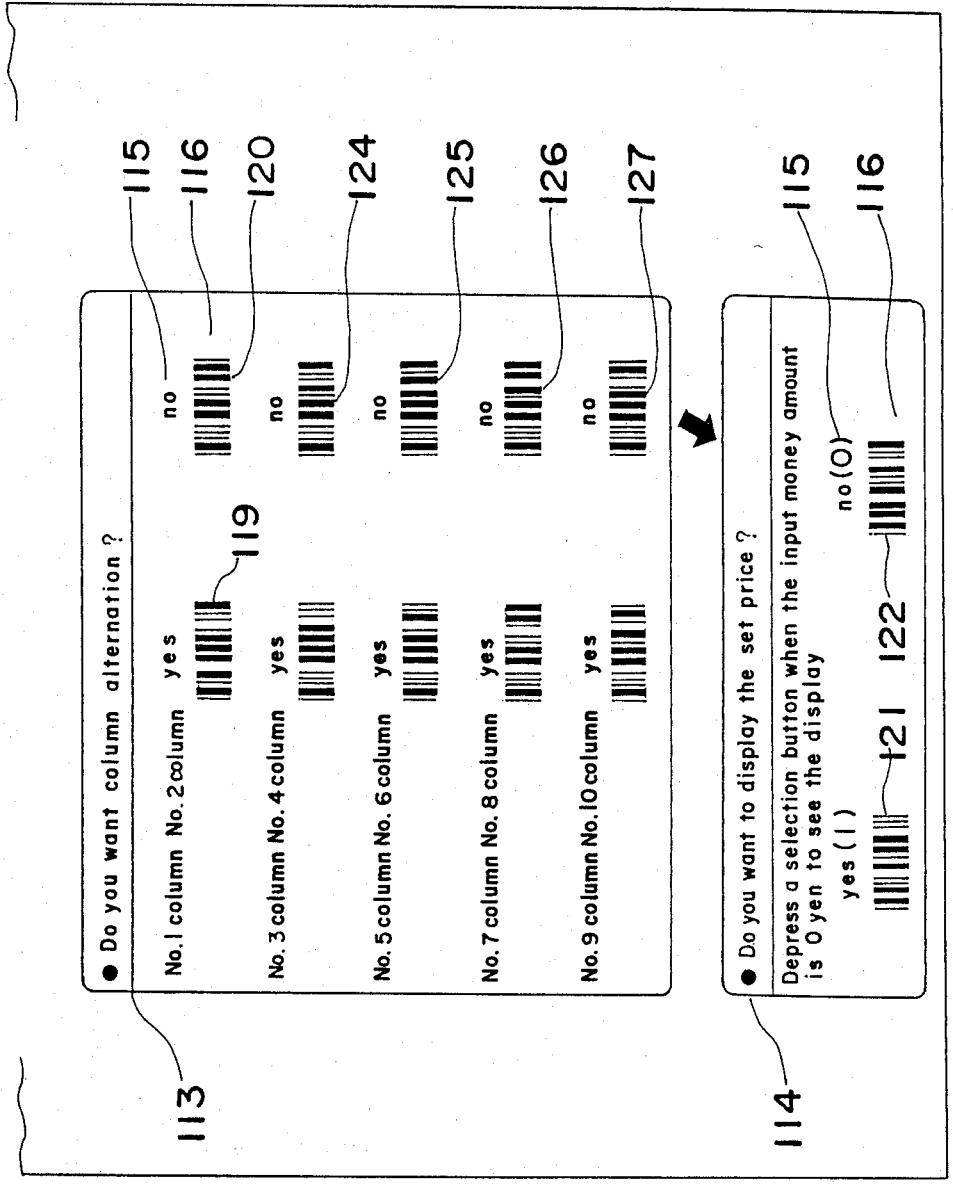

FIG. 19 shows a bar sheet (110) expressing the other setting information except for the selling prices. Setting conditions of 1, 2, 3 as the number limit of items (111) of large purchases (multi-vending), setting conditions as to whether or not the money is exchanged as an item (112) as to whether or not the money should be exchanged, setting conditions as to whether or not No. 1 column and No. 2 column are alternately sold as an item (113) as to whether or not the commodity sales columns should be put into column alternation sales operating conditions, also setting conditions as to whether or not the display is performed as an item (114) as to whether or not the sales setting price is displayed on an inputted money amount display each time a commodity selection button is depressed are described on the bar sheet (110) with the direct-vision readable display portion (115) and the bar code display portion (116) as a pair. Rub the bar code, corresponding to the conditions to be set for each item, with the bar code reader (4) in the order of each item (111), (112), (113), (114), and the conditions are stored in the memory portion so that the operation is effected in accordance with the conditions. Rub the bar code (117) with two as the number limit of the multi-vending in the item (111), and the processing codes 0D, 02 are introduced to the microcomputer MC. The microcomputer MC stores in the memory the limit number "2" of the multi-vending through the inputting of the code. The multi-vending allows the sales operation of the commodity to be continuously performed by the repeated selection switch operations, while the remaining amount after the commodity sales is still more than the selling prices of the commodities. However, as the commodity return opening (43) of the automatic vending machine may be clogged with a plurality of commodities, the limit number of the multi-vending is set in accordance with the commodity return opening (43) and the size of the commodity. Even if the remaining money-amount after the sale of the second commodity is more than the selling prices of a commodity when the limit number has been set to 2, the automatic vending machine pays the change from the remaining money amount to prohibit the large buy of three or more. Also, though it is not shown, the number of the large buy can be set without limit through the inputting of such processing code 0D, 00 as shown in FIG. 8A. Rub the bar code (118) for exchange setting in the item (112), and the processing code 0D, 1A is produced. The microcomputer MC stores the exchange setting in the memory through the inputting of the code. Input 500 yen into the automatic vending machine and then operate the return lever (45), and the automatic vending machine turns on the return switch (50) to pay 100 yen onto the coin return opening (42) in accordance with the exchange setting. Rub the bar code (119) for the column-alternation setting of the column No. 1 and the column No. 2 in the item (113), and the processing code 10, 01 is produced. The microcomputer MC stores in the memory that the columns No. 1, No. 2 are of the column alternation through the bar code inputting. When the column No. 1 and the column No. 2 have been set in the column alternation, the commodities are alternately taken out sequentially from both columns where the same commodities are accommodated in the both columns, whenever one of the respective selection switches (S1), (S2) corresponding to both columns is operated, and the commodities in both columns are sold in equal. To release the columns alternation of the columns No. 1, No. 2, rub the bar code (120) and introduce the processing code 10, 00 to the microcomputer MC, and the setting of the column alternation of the columns No. 1 and No. 2 stored in the memory is cleared. Rub the bar code (121) for setting of the selling price display in the item (114), and the processing code 11, 03 is caused. The microcomputer MC stores in the memory the display setting of the setting price through the inputting of the code. The microcomputer MC reads from the memory the set selling price of the column corresponding to the selection switch in accordance with the display setting of such selling prices when the selection switches (S1), (S2) ... (S8) are operated in condition where the coin is not inputted, i.e., in a condition where the inputted money-amount digit is 0 yen. The set selling price is displayed on the display unit (41). To release the setting of the setting price display, rub the bar code (122) and the processing code 11, 02 is introduced into the microcomputer MC.

A particular setting information wherein a series of bar codes (117), (123), (120), (124), (125), (126), (127), (122) are combined with each other, showing the shown information of the standard in each of the items (111), (112), (113), (114) is set on the bar sheet (110) of FIG. 19 of the present invention. Namely, to effect the standard operation as the automatic vending machine, a literal statement (117) of standard setting, the bar code display portion (118) satisfying the conditions, the respective one conditions of each of the items (111), (112), (113), (114) are particularly displayed with the black arrow marks for convenience to describe which conditional setting of each item the standard setting is, because it is troublesome to set one of the conditions of each of the items (111), (112), (113), (114). Accordingly, rub the bar code (118) of the standard setting with the bar code reader (4), and the processing code 01, 0G is introduced into the microcomputer MC by the input unit (1). The microcomputer MC stores in the memory each of the conditions that the large buy is restricted to two, the exchanging operation is not effected, the column sales are not performed among all the sales columns, and the selling prices are not performed. In the present invention, particular conditions may be decided including not only these conditions setting, but also the other conditions, or including a plurality of completely separate conditions so that the series may be displayed by a single bar code. Also, the title is not restricted to the display of the "standard setting", but can be proper statement which conforms to the particular conditions.

The information, which is set for each of the items (111), (112), (113), (114) is displayed on the display unit (41) through the provision of the operation order of the various confirmations. Namely, according to FIG. 6A, though it is not shown in the bar code, introduce the processing code 0A, 00 into the microcomputer MC, and the microcomputer MC reads the limit number of the multi-vending stored in the memory to display it on the display unit (41). In the case of the single vending, "1" is displayed on the display unit (41). Also, introduce the processing code 0A, 03 into the microcomputer MC, and the microcomputer MC displays "1" on the display unit (41) when the exchanging operation is performed, and "0" thereon when the exchanging operation is not performed, in accordance with the data of the existence of the exchange stored in the memory. Introduce the processing codes 0A, 05 into the microcomputer MC, and the microcomputer MC displays "1" on the display unit (41) when the displaying operation is performed and "0" thereon when the displaying operation is not performed, in accordance with the data of the existence of the set price display through the action of the selection switches (S1), (S2) . . . (Sn). Give the processing code to the microcomputer MC by the bar code and the set information can be confirmed through the display unit (41).

The processing codes 0F·00, 0F·1F . . . 0F·0V shown in FIG. 6A through FIG. 6D show the operation orders of the vending tests of the columns, corresponding to the columns No. 1 through No. 32. The processing code 12, 01 shown in FIG. 6A indicates the setting information into so-called free vending condition wherein the commodities are sold by the actions of the selection switches (S1), (S2) . . . (S8) without the inputting of the coins. Also, the processing code 12, 00 shows the setting information into the free vending condition releasing. The processing codes 11·10, 11·11, 11·12 shown in FIG. 6B show the operation orders to sales money-amount clearance, sales number clearance, sales money-amount and sales number clearances.

The above-described operation order and setting information show one example. There are various operation orders and setting informations in accordance with the forms of the various automatic vending machines. In the case of a cup beverage vendor, by which the beverage is poured into a cup and is sold, the selling amount of the beverage is decided by the operating time of a feed electro-magnetic valve, but the timer data of the operating time can be inputted as the setting information. And the microcomputer (19) of the processing circuit (7) can be replaced by the microcomputer MC, which is the controlling circuit (2) of the automatic vending machine.

According to the present invention, a smaller-sized input unit can be provided to construct an input portion, which is composed of a sheet on which bar codes describing an operation order and set information are printed, and of a bar code reader for converting the patterns of the bar code into electric signals. A digital signal converting means and a code converting means are built-in within the controlling circuit of an automatic vending machine so that the input portion and the controlling circuit can be connected with each other only with the lead wires of the bar code reader. The signal harness for input use can be remarkably reduced as compared with the conventional keyboard system. Also, as the operation order and the set information are inputted only by the rubbing operation of a bar code printed on the bar sheet thereon against the bar code reader, the operation order and the set information can be changed or added only by the exchange of the bar sheet. As the bar sheet with a direct-vision readable display portion, displayed in letters, numerals, etc. readable through direct-vision, is provided near the bar code display portion, the setting is easier to be performed. In addition, as the direct-vision readable display portion is displayed in a color by which the detection output almost similar to the space of the bar code is provided, the error operations are not caused even if the direct-vision readable display portion is rubbed by a bar code reader. Also, as the bar sheet is expressed in one bar code with the standard setting of various set informations being collected as particular set information, a plurality of various set informations are automatically set in the standard setting by the bar code so that the setting is further simplified in the use of the standard setting.

Although the present invention has been described and illustrated in detail, it is to be already understood that the same is by way of illustration and example only and is not to be taken by way of limitation, the spirit and scope of the present invention being limited only by the terms of the appended claims.

What is claimed is:

1. An input unit of an automatic vending machine comprising, in combination:
    a bar sheet printed by given bar codes with selling prices to be set into an automatic vending machine;
    a bar code reader of hand scanner type including a light emitting element adapted to sequentially apply its light on bars or spaces of said bar sheet through manual movement in accordance with the arrangement of the bars and spaces of said bar codes, and a photoelectric conversion element adapted to detect the light reflection amount from said light emitting element to output electric signals corresponding to the bar code;
    means for converting the signals from said photoelectric conversion element into digital signals;
    means for converting selling prices shown by said digital signals into codes recognizeable by the automatic vending machine; and
    plurality of commodity selection switches corresponding to a plurality of selling columns, each of said commodity selection switches being adapted to select an applicable selling column for setting a sales price in a mode of said price setting.

2. An input unit of an automatic vending machine comprising, in combination,
    a bar sheet printed by given bar codes representing a command for indicating total amount sold data,
    a bar code reader of hand scanner type including a light emitting element adapted to sequentially apply its light on bars or spaces of said bar sheet through manual movement in accordance with the arrangement of the bars and spaces of said bar codes, and a photoelectric conversion element adapted to detect the light reflection amount from said light emitting element to output electric signals corresponding to the pattern of the bar code;
    means for converting the signals from said photoelectric conversion element into digital signals;

means for converting selling prices shown by said digital signals into codes recognizeable by the automatic vending machine; and a plurality of comodity selection switches corresponding to a plurality of selling columns, each of said commodity selection switches being adapted to select the applicable selling column for indicating total amount sold data onto an indicator.

3. An input unit of an automatic vending machine in accordance with claim 1, further comprising an input mode appointing switch being adapted to set the automatic vending machine into an input mode.

4. An input unit of an automatic vending machine as defined in claim 3, wherein said bar sheet includes bar codes printed thereon representing a command for setting a sales price, the output of bar codes showing the command being adapted to set said automatic vending machine into a sales price setting mode when said automatic vending machine is in the input mode.

5. An input unit of an automatic vending machine as defined in claim 3, wherein said bar sheet is printed with a bar code representing a command for setting each of all selling columns at the same sales price, the output of said bar code showing the command being adapted to set the automatic vending machine into a same sales price setting mode when said automatic vending machine is in the input mode.

6. An input unit of an automatic vending machine in accordance with claim 1, wherein said bar sheet is provided with bar codes display portion in which the selling prices is expressed in a plurality of black bars and the spaces among the bars, and direct-vision readable display portion in which alphanumeric display readable through the direct-vision readable display is provided near said bar code display portion, said direct-vision readable display portion being in a color by which a detection output similar to the space of said bar code is provided through said bar code reader.

7. An input unit of an automatic vending machine as defined in claim 7, further comprising an input mode appointing switch being adapted to set the automatic vending machine in an input mode.

8. An input unit of an automatic vending machine as defined in claim 7, wherein said bar sheet is printed thereon with bar codes representing a command for indicating total amount sold data, the output of said bar codes showing the command being adapted to set the automatic vending machine into a total amount sold data indication mode when said automatic vending is in the input mode.

9. An input unit for an automatic vending machine comprising, in combination:

a bar sheet printed with preselected bar codes with selling prices to be set into an automatic vending machine;

a bar code reader of the hand-scanner type including a light emitting element adapted to sequentially apply its light on bars or spaces of said bar sheet through manual movement in accordance with the arrangement of the bars and spaces of said bar codes, and a photoelectric conversion element adapted to detect the light reflection amount from said light emitting element to output electric signals corresponding to the pattern of the bar code;

means for converting the signals from said electric conversion element into digital signals;

means for converting the selling prices shown by said digital signals into codes recognizeable by said automatic vending machine; and means for specifying column setting said selling prices, said sales column to be set in price being specified by the commodity switches prices operated by a customer during purchase.

* * * * *